US010608991B2

United States Patent
Ahuja et al.

(10) Patent No.: US 10,608,991 B2
(45) Date of Patent: *Mar. 31, 2020

(54) SYSTEMS AND METHODS FOR ACCELERATED PATTERN MATCHING

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Sumanth Gangashanaiah, Cupertino, CA (US)

(73) Assignee: ShieldX Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,085

(22) Filed: Feb. 14, 2019

(65) Prior Publication Data

US 2019/0251082 A1    Aug. 15, 2019

Related U.S. Application Data

(63) Continuation of application No. 15/224,396, filed on Jul. 29, 2016, now Pat. No. 10,212,132.

(51) Int. Cl.
*H04L 29/06* (2006.01)
*G06F 16/903* (2019.01)
*G06F 16/2455* (2019.01)

(52) U.S. Cl.
CPC .... *H04L 63/0245* (2013.01); *G06F 16/24568* (2019.01); *G06F 16/90344* (2019.01); *H04L 63/1416* (2013.01); *H04L 63/1441* (2013.01)

(58) Field of Classification Search
CPC ..... H04L 63/02; H04L 63/0254; H04L 63/14; H04L 63/1425; H04L 63/1441;
(Continued)

(56) References Cited

U.S. PATENT DOCUMENTS 7,225,188 B1    5/2007 Gai et al.
8,024,802 B1    9/2011 Preston
(Continued)

OTHER PUBLICATIONS

Non-Final Office Action from U.S. Appl. No. 15/224,396, dated Aug. 7, 2018, 13 pages.
(Continued)

*Primary Examiner* — Khalil Naghdali
*Assistant Examiner* — Shaqueal D Wade
(74) *Attorney, Agent, or Firm* — Nicholson De Vos Webster & Elliott LLP

(57) ABSTRACT

System, methods, and apparatuses enable a network security system to more efficiently perform pattern matching against data items. For example, the disclosed approaches may be used to improve the way in which a deep packet inspection (DPI) microservice performs pattern matching against data items (e.g., network traffic, files, email messages, etc.) in order to detect various types of network security threats (e.g., network intrusion attempts, viruses, spam, and other potential network security issues). A DPI microservice generally refers to an executable component of a network security system that monitors and performs actions relative to input data items for purposes related to computer network security.

20 Claims, 15 Drawing Sheets

(58) Field of Classification Search
CPC ... H04L 63/1408; H04L 63/20; H04L 43/028; G06F 17/30386
See application file for complete search history.

(56) References Cited

U.S. PATENT DOCUMENTS

| | | | |
|---|---|---|---|
| 8,813,221 B1* | 8/2014 | Dubrovsky | H04L 63/1408 726/22 |
| 9,288,159 B2* | 3/2016 | Hutt | H04L 49/25 |
| 9,363,275 B2 | 6/2016 | Ficara et al. | |
| 9,785,701 B2 | 10/2017 | Yishay et al. | |
| 2007/0006293 A1 | 1/2007 | Balakrishnan et al. | |
| 2009/0262745 A1 | 10/2009 | Leong et al. | |
| 2011/0238855 A1 | 9/2011 | Korsunsky et al. | |
| 2012/0143912 A1* | 6/2012 | Horton | G06F 16/24564 707/774 |
| 2014/0244554 A1* | 8/2014 | Atasu | G06F 9/4498 706/12 |
| 2016/0267142 A1* | 9/2016 | Cafarella | G06F 16/24568 |
| 2016/0321289 A1 | 11/2016 | Zak et al. | |
| 2016/0344759 A1 | 11/2016 | Zak et al. | |

OTHER PUBLICATIONS

Non-Final Office Action from U.S. Appl. No. 15/224,401, dated Jul. 27, 2018, 23 pages.
Notice of Allowance from U.S. Appl. No. 15/224,396, dated Dec. 26, 2018, 11 pages.
Yu F., et al., "Fast and Memory-Efficient Regular Expression Matching for Deep Packet Inspection," ANCS'06, Dec. 2006, 10 pages.

* cited by examiner

Pattern State Diagram 604

Pattern State Table 610

| Current State | Input | Next State | Match |
|---|---|---|---|
| null | "P" | P | no |
|  | default | null | no |
| P | "P" | P | no |
|  | "E" | E | no |
|  | default | null | no |
| E | "P" | P | no |
|  | "A" | A | no |
|  | default | null | no |
| A | "P" | P | no |
|  | "R" | R | yes |
|  | default | null | no |
| R | "P" | P | no |
|  | default | null | no |

FIG. 10

| CurrentState | Input | Next State | Match | Callback |
|---|---|---|---|---|
| X | "A" | S1 | no | no |
| | "B" | S2 | no | no |
| | "C" | S3 | no | no |
| | ⋮ | ⋮ | ⋮ | ⋮ |
| | "X" | S24 | no | no |
| | "Y" | S25 | yes | Callback S25 |
| | "Z" | S26 | no | no |
| | default | S27 | no | no |

SYSTEMS AND METHODS FOR ACCELERATED PATTERN MATCHING

CROSS-REFERENCE TO RELATED APPLICATION

This application is a continuation of and claims priority to U.S. patent application Ser. No. 15/224,396, filed on Jul. 29, 2016, which is hereby incorporated by reference in its entirety.

TECHNICAL FIELD

Embodiments relate generally to computer network security. More specifically, embodiments relate to techniques for accelerating pattern matching processes used by deep packet inspection (DPI) tools and other computer network security functions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The vast majority of organizations today rely on computer systems and networks for an increasingly wide variety of business operations. As the reliance on these systems networks has grown, so too has the importance of securing those computer systems and networks against internal and external security threats. However, the breadth and complexity of security threats targeting such computer systems and networks is far and wide and ever growing. To monitor and address these security threats, organizations increasingly rely on sophisticated computer network security applications and hardware such as firewalls, anti-virus tools, data loss prevention software, etc.

Some types of computer network security applications involve deep packet inspection (DPI). At a high level, DPI involves monitoring network traffic for instances of viruses, spam, network intrusion attempts, protocol non-compliance, etc., by searching for patterns in the data portion, headers, and other protocol structures comprising network traffic. For example, a DPI process may monitor incoming and outgoing network traffic for patterns known to correspond to malicious or unwanted network traffic and block any traffic containing one or more of the known patterns. A benefit of using DPI to monitor computer network traffic in this way is that a network security application can "understand" and monitor the use of certain network protocols and higher layer applications (e.g., HTTP, email, etc.) which may span multiple network packets, whereas other packet filtering techniques may operate only on individual packets. However, as the number of patterns to be detected in network traffic increases, the computational complexity of checking potentially vast amounts of network traffic and other data for the existence of such patterns can quickly lead to undesirable performance delays.

BRIEF DESCRIPTION OF THE DRAWINGS

In the drawings:

FIG. 10 illustrates an example of an enhanced pattern state table including a callback function identifier field in accordance with the disclosed embodiments;

DETAILED DESCRIPTION

Figure 1:
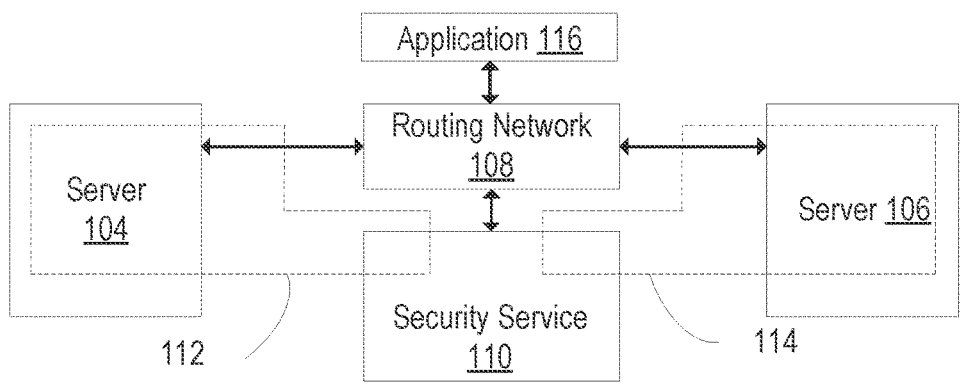
FIG. 1 is a block diagram illustrating a security service configured to monitor traffic sent among an application and one or more servers through a routing network in accordance with the disclosed embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments are described herein according to the following outline:

1.0. General Overview
2.0. Operating Environment
2.1. System Overview
2.2. Deep Packet Inspection (DPI) Microservices
3.0. Functional Overview
3.1. Pattern Matching Overview
3.2. Pattern Matching Using State Leaps
3.3. Alternative Pattern Matching Tables
3.4. Pattern Matching Using Pattern Functions
4.0. Example Embodiments
5.0. Implementation Mechanism—Hardware Overview
6.0. Extensions and Alternatives 1.0. General Overview Modern data centers and other computing environments can include anywhere from a few computer systems to thousands of systems configured to process data, service requests from remote clients, and perform numerous other computational tasks. The large number of interworking systems, applications, etc., make such computing environments susceptible to a wide variety of network security issues. A number of network security tools are available to protect such systems and the computer networks interconnecting these systems, and many of these tools comprise a monolithic set of network security functions. For example, a typical network security tool might comprise a hardware unit including firewall services, routing services, virtual private network (VPN) services, etc.

The type of network security tool described above is useful for providing a variety of network security functions as a single unit. However, efficiently scaling these types of network security tools is often challenging. For example, if a particular computer environment might benefit from increased firewall resources, a system administrator may install one or more additional hardware units each including firewall services in addition to a suite of other network security functions. While the addition of these new hardware units may meet the increased firewall resource needs, some of the hardware units may include unnecessary and/or underutilized resources devoted to virtual private network (VPN) services, data loss prevention (DLP) services, or other security services.

One way in which many modern computing environments scale resources more efficiently is with the use of virtualized computing resources. A virtualized computing resource generally refers to an emulated computer system that, like a physical computer, runs an operating system and applications, but may also use the same physical resources as one or more other virtualized resources. According to one embodiment, these types of virtualized infrastructures can be used to efficiently scale network security applications with the use of "microservices," where a microservice represents a particular type of virtualized computing resource packaged as a software container. For example, separate microservices may be created to provide firewall resources, DLP services, VPN services, etc. In general, the use of such microservices can provide greater flexibility because the microservices can be easily deployed and scaled in response to variable demands for various network security services.

The type of efficient network security application scaling described above can be achieved with the use of a next generation software firewall that is configured to scale network security services using microservices. Although many of the techniques described herein are explained with reference to a microservice-based network security application, the techniques are also applicable to other types of network security systems.

2.0. Operating Environment 2.1. System Overview

FIG. 1 is a block diagram illustrating a networked computer environment in which an embodiment may be implemented. FIG. 1 represents an example embodiment that is provided for purposes of illustrating a clear example; other embodiments may use different arrangements.

The networked computer system depicted in FIG. 1 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 110 may be configured to monitor network traffic and other data sent between an application 116 and one or more servers 104, 106 through a routing network 108. The security service 110 comprises one or more "microservices" used to monitor and perform various actions relative to data items (e.g. network traffic, files, email messages, etc.) sent to and received from one or more applications 116 and servers 104, 106. The microservices comprising security service 110 do not need to be confined to one physical server such as a server 104, 106. For example, one or more microservices of the security service 110 may be executed on server 104 and other microservices of the security service 110 are executed on 106. In some embodiments, the security service 110 is executed on a different server from one or more servers for which the security service is responsible for monitoring and protecting.

In an embodiment, a routing network 108 provides connectivity among servers 104, 106, security service 110, and application 116. In some embodiments, routing network 108 is partially configured responsive to hypervisor configuration of servers 104 and 106. In some embodiments, a routing network 108 is partially or entirely configured responsive to hypervisor configuration of servers 104 and/or 106.

In one embodiment, by virtue of routing information included in channel data encapsulation packets, data traveling between an application 116 and server 104 and/or server 106 is routed to the correct server, and is kept separate from data traveling between the application 116 and the other server. Accordingly, what is essentially a private network 112 may be created between the server running security service 110 and server 104. Similarly, what is essentially a private network 114 may be created between the server running security service 110 and server 106.

Figure 2:
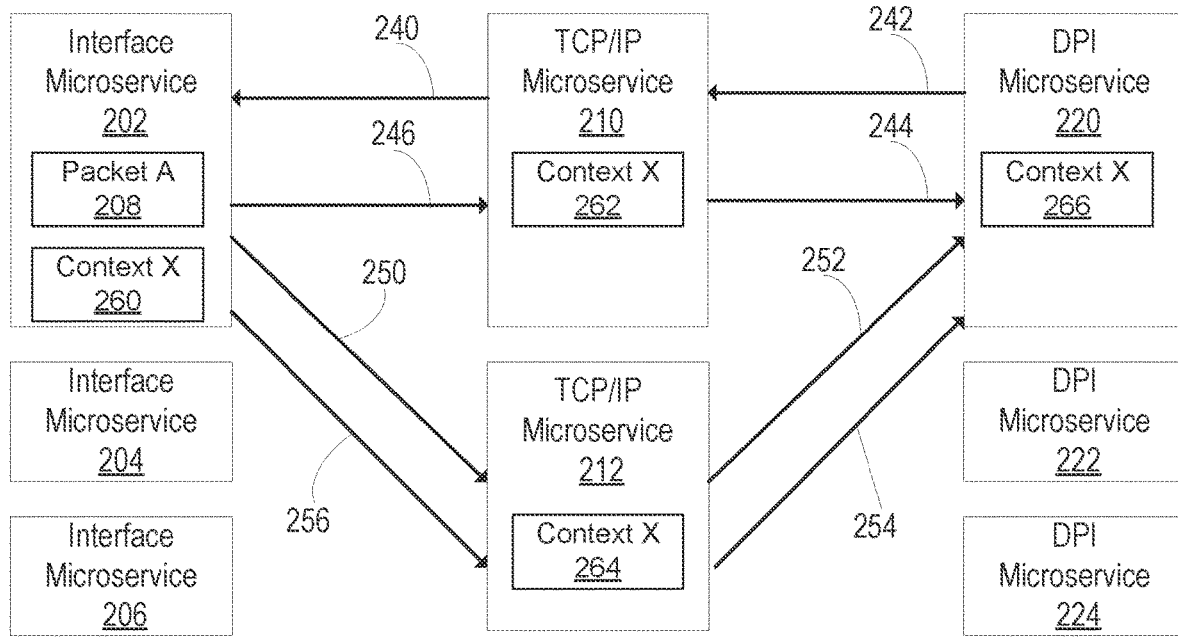
FIG. 2 is a block diagram illustrating a flow of application data through a stateless processing, fault-tolerant microservice environment in accordance with the disclosed embodiments.

FIG. 2 is a block diagram illustrating a flow of application data through a stateless processing, fault-tolerant microservice environment in accordance with disclosed embodiments. As illustrated, security system 200 includes interface microservices 202, 204, and 206, TCP/IP microservices 210 and 212, and DPI microservices 220, 222, and 224. Other examples include a different number of microservices and/or a different number of microservice types. In the example of FIG. 2, an interface microservice 202 receives packet A 208, and generates a context X 260.

One benefit of the security system illustrated in FIG. 2 is the handling of state. For example, if packets belong to a certain context X, the security system 200 may enable both TCP/IP microservices 210 and 212 to perform meaningful work on the packets. By implementing TCP/IP processing as microservices 210 and 212 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context 262 obtained by TCP/IP microservice 210 as part of packets received from interface microservice 202 as transmission 240. Context 262, when transmitted to DPI microservice 220 as part of transmission 242 along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 200 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to the example of FIG. 2, the generation of context X 260 may include considering properties associated with packet A 208 (e.g., such as an n-tuple detailing routing information), and also a state lookup or a context lookup, in addition to other information. Interface microservice 202 provides packet A 208 and context X 260 to TCP/IP microservice 210 or 212 via path 240 or 250, respectively. For example, interface microservice 202 may conduct a load-balancing to select one of the TCIP/IP microservices to forward the packet A 208 and the context X 260.

In an embodiment, TCP/IP microservices 210 and 212 are stateless, but may benefit from the context X generation performed by interface microservice 202. For example, whichever of TCP/IP microservices 210 and 212 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 2, TCP/IP microservices 210 or 212 forwards the extracted data and/or the data resulting from the security processing to DPI microservice 220 via paths 242 or 252, respectively. Along with the transmitted data, TCP/IP microservice 210 or 212 forwards context X 262 or 264, respectively, to a DPI microservice 220. In some embodiments, context X 260, 262, 264, and 266 are substantially identical.

In an embodiment, DPI microservice 220 is also stateless and may use the context provided by TCP/IP microservice 210 or 212 in transmission 242 or 252. DPI microservice 220 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 210 fails and interface microservice 202 instead utilizes TCP/IP microservice 212, DPI microservice 220 may obtain the context from the transmission of reassembled TCP content in transmission 252.

Although FIG. 2 does not show a second packet, when a subsequent packet associated with the same context is received, interface microservice 202 may conduct a load balancing and select one of the TCP/IP microservices to forward the packet along with context X 260. In one embodiment, interface microservice 202 chooses to forward the second packet to TCP/IP microservice 212 via path 250. TCP/IP microservice 212 performs some security processing, then transmits the second packet and context X 264 to DPI microservice 220 via path QAF52. After performing some security processing, DPI microservice 220 responds to TCP/IP microservice 212 via path 254, and TCP/IP microservice responds to interface microservice 202 via path 256.

Summarizing the operation of an embodiment as illustrated by FIG. 2, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 2, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

2.2. Deep Packet Inspection (DPI) Microservices

Figure 3:
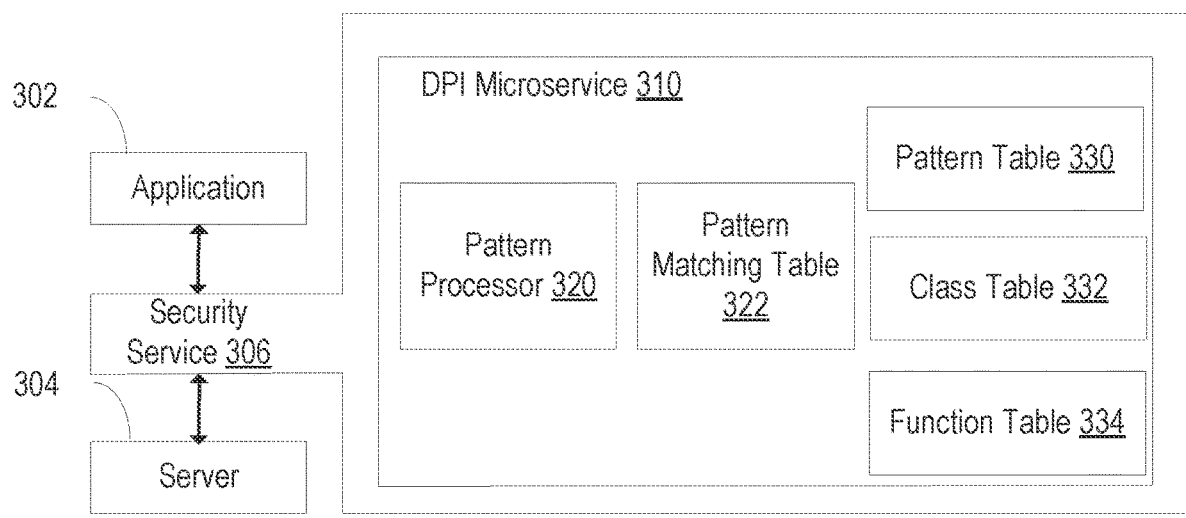
FIG. 3 is a block diagram illustrating example components of a DPI processing microservice in accordance with the disclosed embodiments.

FIG. 3 is a block diagram illustrating example components of a DPI microservice. In an embodiment, a security service 306 comprises a DPI microservice 310, which further comprises a pattern processor 320, a pattern matching table 322, a pattern table 330, a class table 332, and a function table 334. For example, the security service 306 may correspond to the security service 306 depicted in FIG. 1, where the DPI microservice 310 is one of a possible plurality of microservices running within the security service 306. For example, although not depicted, the security service 306 may also include one or more data loss prevention (DLP) microservices, TCP/IP microservices, etc. FIG. 3 represents an example embodiment that is provided for purposes of illustrating a clear example; other embodiments may use different arrangements.

According to an embodiment, a DPI microservice 310 generally represents a module for performing deep packet inspection on data items including, for example, network messages, email messages, files, etc., sent among application(s) 302 and/or server(s) 304. In one embodiment, the DPI microservice 310 represents a software "container," where a container represents an isolated user space instance within a virtualization environment in which the kernel of an operating system allows for the existence of multiple isolated user-space instances. In other examples, the DPI microservice 310 may represent a different type of virtual machine instance, a thread of execution, a standalone software application, or any other type of computing module. In some embodiments, DPI functionality of a security service 306 is provided by a plurality of DPI microservices, wherein the number of microservices in operation at any given time may be scaled to meet the DPI processing requirement of the traffic processed by security service 306.

In an embodiment, a pattern processor 320 represents a process for performing pattern matching and other related functions in conjunction with one or more of a pattern matching table 322, a pattern table 330, a class table 332, and/or a function table 334. In one embodiment, a pattern table 330 stores, among other information, a set of patterns to be searched for in data items received by the DPI microservice 310. For example, the set of patterns stored in a pattern table 330 may include patterns known to be frequently present in malicious types of network traffic, spam email messages, viruses, etc. In other examples, some patterns stored within pattern table 330 may indicate a probability of a security event such that a plurality of patterns are used to confirm the presence of said security event.

In an embodiment, the set of patterns stored in a pattern table 330 form the basis for one or more pattern matching table(s) 322, where a pattern matching table 322 represents a set of pattern matching states that pattern processor 320 uses to determine the presence of one or more patterns in input data items. Pattern processor 320 may use a pattern matching table 322 by applying the data to be scanned, one letter, byte or other portion at a time, as a lookup, along with a current state, to generate a next state. In one embodiment, one or more of the patterns in a pattern table 330 represents "regular expressions," where a regular expression is based on a particular language for defining sequences of characters to define search patterns. If one or more of the patterns are expressed as regular expressions, for example, a corresponding pattern matching table 322 may be referred to as a regular expression matching table, where a regular expression matching table may be used by the pattern processor 320 to perform regular expression matching of patterns against input data items.

As used herein, regular expression matching refers to a process of determining whether one or more patterns defined by one or more regular expression, and contained within a pattern table 330, are present in input data items. Although some of the examples described herein are explained with reference to regular expressions and regular expression matching, the techniques are also applicable to other types of pattern matching. As used herein, a pattern may be a regular expression in the form used for specification within a pattern table 330. In the case of most textual patterns, the pattern and corresponding regular expression may be the same. Regular expressions are generally standardized (such as POSIX regular expressions or Perl Compatible Regular Expressions (PCRE) whereas patterns may be implementation specific or be a superset of standardized regular expressions.

In one embodiment, a class table 332 comprises a set of class entries, where each class entry specifies a set of one or more patterns from the pattern table 330 which are members of the class. Each class, for example, may include patterns relating to similar types of data items, similar types of data item content, similar types of patterns, etc. For example, one pattern class may include patterns relating to detecting network security issues found in HTTP messages, while another class includes patterns relating to detecting a particular type of spam email message, and so forth.

In one embodiment, a function table 334 comprises a set of entries each comprising and/or identifying a pattern function. At a high level, a pattern function is an executable code segment configured to accelerate a process for matching certain patterns against input data items. In general, each pattern function may be configured to search data items for patterns that specify one or more fixed offsets within a data item at which a particular pattern may be located (referred to herein as "fixed offset patterns"). For example, one particular pattern may specify a numerical value pattern known to exist, if at all, at one or more particular locations within a certain type of network message (e.g., as a value for one or more particular fields within an HTTP message). In this instance, instead of searching for the pattern at all locations within input data items, a more efficient pattern function may be created and which is configured to search for the presence of the pattern only at the one or more particular locations specified by the pattern syntax. In addition to a pattern functions ability to more efficiently search for fixed offset patterns, by removing these patterns from a pattern table 330 to a function table 334, the speed with which the pattern processor 320 can process data items using the pattern matching table 322 may increase.

Regular expressions and other types of patterns may contain fixed or variable offsets that require a specific number or range of inputs characters to exist from an anchor in the data stream for a match. As examples, a regular expression may require a pattern "ABC" to be present at the beginning of a data stream, at least X characters from the start a data stream or within X characters of another regular expression. Fixed offset patterns are those patterns for which the position within the data stream to search for a pattern can be determined to be less than the length of the data stream itself. This includes, but is not limited to, patterns at an exact offset in the data stream, patterns at least X characters after the start of the data stream, patterns between offsets X and Y in the data stream and other pattern limitations wherein the full data stream need not be compared.

The creation and use of pattern matching tables 322, pattern tables 330, class tables 332, and function tables 334, among other components, is described in more detail hereinafter.

3.0. Functional Overview

Approaches, techniques, and mechanisms are disclosed that enable a network security system to more efficiently perform pattern matching against input data items. For example, the approaches described herein may be used to improve the way in which a deep packet inspection (DPI) microservice performs pattern matching against data items (e.g., network traffic, files, email messages, etc.) in order to detect various types of network security threats (e.g., network intrusion attempts, viruses, spam, and other potential network security issues). As used herein, a DPI microservice generally refers to an executable component of a network security system, such as the system described in Section 2.0, that monitors and performs actions relative to input data items for a variety of network security related purposes. As illustrated in FIG. 3, for example, a DPI microservice 310 may be a component of a security service 306, where the DPI microservice 310 is one instance of network security microservice among a possible plurality of other microservices.

3.1. Pattern Matching Overview

The network security functions performed by a DPI microservice and other network security services may involve "pattern matching" a set of patterns against input data items. In this context, pattern matching generally refers to a process for determining whether a given sequence of input tokens (e.g., a sequence of characters, bytes, or other elements of an input data item) contains one or more defined patterns (e.g., token sequences corresponding to words, phrases, byte sequences, or other patterns of interest). As one example, in the context of spam detection, a DPI microservice may use pattern matching to determine whether incoming email messages contain one or more defined patterns potentially known to correlate with spam messages (e.g., the words/phrases "stocks", "eliminate debt", "order now", etc.). In instances where the patterns to be matched are represented as regular expressions, the pattern matching may be referred to as regular expression matching.

To further illustrate an example of how a DPI microservice may use pattern matching to detect network security threats, consider an example where a DPI microservice includes a list of several hundred or thousands of words and phrases known to commonly appear in spam email messages. The DPI microservice may be configured to receive incoming email messages for a network of computer systems and to determine whether each email message contains one or more of the predefined words and/or phrases, where the determination is made by matching a pattern associated with each word and phrase against the email message. For example, if one of the words is "stocks", then the DPI microservice may determine whether the sequence of characters "s", "t", "o", "c", "k", and "s" is present at any location within incoming email messages.

Based on the example pattern matching process described above, for example, a DPI microservice may be configured flag email messages that contain some number and/or combination of the predefined words and/or phrases as potential spam messages. For example, if the DPI microservice detects the presence of the phrase "special promotion" in an email, the DPI microservice may flag the email as spam. As another example, if the DPI microservice detects each of the words "stock," "investment," and "guarantee," then the combination of those words may cause the DPI microservice to flag the email as spam. Techniques such as Bayesian analysis may be used to assign weights or probabilities to individual patterns and to sum those weights or probabilities to make a determination regarding the processed data.

In order to determine whether a data item contains one or more predefined patterns in a reasonable amount of time, a DPI microservice may be configured to scan input data items in one pass for all of the patterns. For example, if a DPI microservice is configured to detect the presence of one or more of the patterns "stock," "investment," and "guarantee," the DPI microservice may be configured to scan each incoming email message in one pass for all three patterns at the same time instead of scanning incoming messages for each pattern separately. As described in more detail hereinafter, in one embodiment, a DPI microservice may scan data items for a plurality of patterns in a single pass by representing the plurality of patterns as a single finite state machine and/or state transition table against which the data items are processed. However, analyzing and searching a large number of incoming data items using a state-based representation of many different patterns presents a number of challenges due in part to the complexity of such state-based representations as the number of patterns to be checked increases.

The complexity of searching data items for a large number of patterns is increased even further when the patterns include not only simple strings but also variable patterns. For example, one pattern may specify a search for dates of the form "??/??/????", where each of the "?" characters of the pattern represents a variable numeric character. In this example, the defined pattern may match any of the strings such as "04/18/1954", "01/10/2009", and "44/66/5000", but may not match "Apr. 18, 1954" or "Wednesday". More sophisticated patterns could also be defined to ensure that only valid dates matching the pattern are detected (e.g., such that the string "01/10/2009" is detected, but an invalid date such as "99/99/3000" is not matched).

One way in which both simple and variable patterns can be expressed is with regular expressions. At a high level, a regular expression comprises a sequence of characters that define a search pattern. While regular expressions may define search patterns for simple words and phrases (e.g., a search pattern for the word "pear" may be specified simply by the regular expression "pear"), regular expressions may also include other syntax that enable specifying searches for variable patterns. For example, if it is desirable to detect the presence of validly formatted email addresses in data items, a regular expression search pattern for any email address may be expressed as "/^([a-z0-9_\.-]+)@([\da-z\.-]+)\.([a-z\.]{2,6})$/", where this regular expression matches any mailbox name followed by the "@" character, followed a domain name.

Different standards may extend the capability of regular expressions at the cost of more processing complexity. The complexity (and resource requirement) for processing regular expressions grows rapidly with both the number of expressions and the complexity of the individual expressions.

Figure 4:
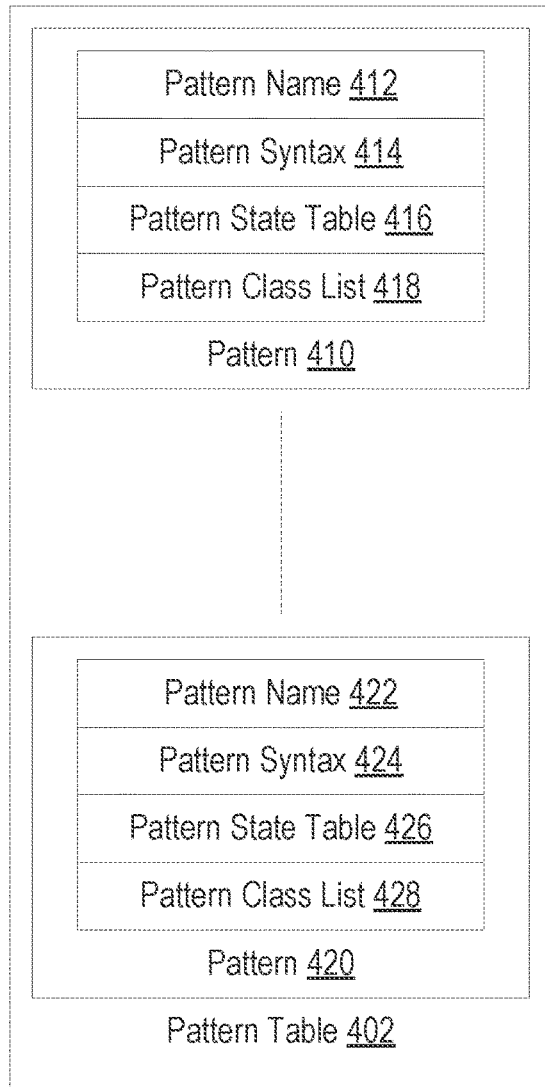
FIGS. 4, 5 are block diagrams illustrating an example pattern table and an example class table, respectively, in accordance with the disclosed embodiments.

FIG. 4 is a block diagram illustrating a pattern table comprising a plurality of pattern entries, each pattern entry specifying information about a particular pattern. For example, a pattern table 402 may store a set of patterns for which a DPI microservice 310 is to search in data items received by the microservice. In one embodiment, a pattern table 402 comprises one or more pattern entries (e.g., pattern entries 410 . . . 420), where each pattern entry comprises a pattern name, a pattern syntax, a pattern state table, and a pattern class list. For example, in reference to the pattern entry 410, the pattern entry comprises a pattern name 412, a pattern syntax 414, a pattern state table 416, and a pattern class list 418. The structure of the pattern table 402 is provided for illustrative purposes only; in other examples, patterns used by a DPI microservice may be stored in other ways and associated with fewer or more data fields.

In an embodiment, a pattern name (e.g., pattern name 412) represents a human-readable label for an associated pattern. For example, if the pattern entry 410 relates to detecting security threats in incoming email messages, the pattern name 412 may be "Clickbait" or "Scam"). As another example, if the pattern 420 relates to detecting malicious HTTP request messages, the pattern name 422 may be "HTTP traffic". Each pattern may have a unique pattern name or, in other examples, some patterns may share portions of a common pattern name such as a prefix, suffix or other portion.

In an embodiment, a pattern syntax (e.g., pattern syntax 414) specifies a sequence of tokens or other syntax used to define the associated pattern. As described above, a pattern syntax may define a static character sequence, a variable character pattern, variable length patterns, a particular byte sequence, or any other type of pattern. In one embodiment, a pattern syntax may comprise a regular expression, where a regular expression comprises a sequence of characters that define a particular search pattern. As described above, a regular expression may specify a static string of letters and/or may also include other more sophisticated syntax for finding patterns having variable characters, length, arrangements, etc. In other examples, a pattern syntax may comprise other types of grammars, parsing languages, etc., to define one or more patterns.

In an embodiment, a pattern state table (e.g., pattern state table 416), also referred to herein as a pattern matching table, comprises a data structure representing a process of searching for the pattern as a finite state machine. At a high level, a finite state machine representation of a pattern comprises a defined set of states and transitions among the set of states, where arrival at one or more of the defined states represents a pattern match. For example, a character-based data item may be processed one character at a time in sequence, where each received character is used to determine a next state transition. In general, a pattern state table or other similar type of data structure may be used to represent a pattern in a format that is more suitable for processing by a DPI microservice or other process.

In an embodiment, a pattern class list (e.g., pattern class list 418) specifies zero or more "classes" to which the corresponding pattern belongs, where each class represents a grouping of one or more patterns. A set of patterns may be grouped into a particular class, for example, because the patterns relate to similar types of data items, detect similar types of patterns, or based on any other characteristics.

Figure 5:
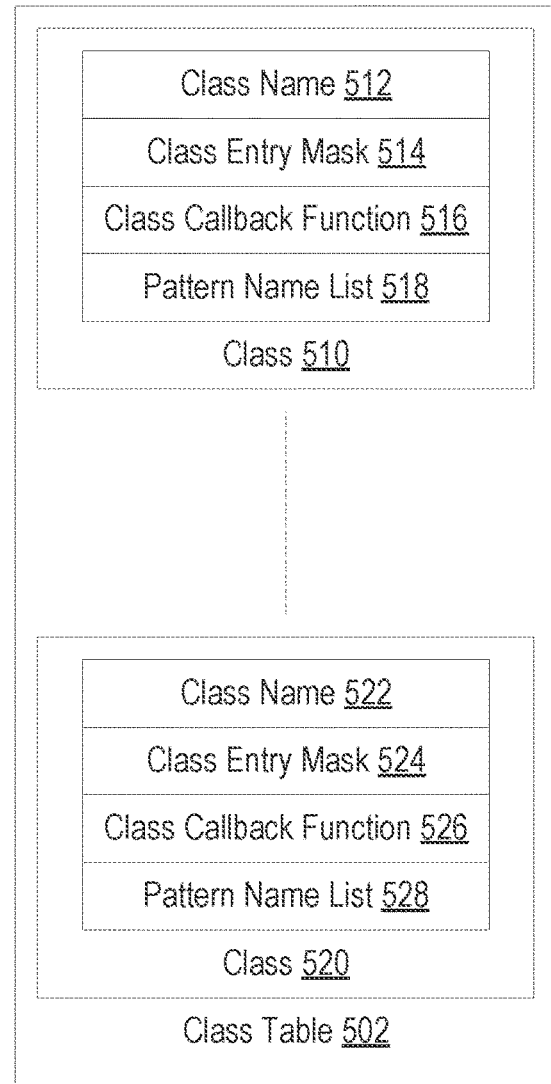

FIG. 5 is a block diagram illustrating a class table comprising a plurality of class entries, each class entry specifying information about a particular "class" of patterns. As indicated above, each pattern class refers generally to a grouping of patterns (e.g., patterns from a pattern table 402). A set of one of more patterns may belong to a particular class because the patterns relate to similar types of input data items (e.g., one class may include patterns frequently found in email messages, another class may include patterns frequently found in HTTP messages, etc.), relate to similar subject matter found within data items (e.g., one class may include patterns which frequently occur in "phishing" attempts, another class may include patterns that relate to financial information, etc.), relate to similar types of patterns (e.g., one class may include patterns which detect various date formats, another class may include patterns which detect similarly structured network protocol messages, etc.), or based on any other grouping characteristics.

In an embodiment, each class entry comprises a class name (e.g., class name 512 for the pattern class entry 510), a class entry mask (e.g., class entry mask 514), a class callback function (e.g., class callback function 516), and a pattern name list (e.g., pattern name list 518). A class name, for example, may represent a human-readable label for the associated class. In an embodiment, a class entry mask may represent a pattern or set of patterns which, when encountered in a data item being processed, causes the associated class callback function to be invoked. In an embodiment, a pattern name list includes a set of identifiers which identify each of the patterns (e.g., from a pattern table 402) belonging to the class. Additional details regarding the use of class tables to perform an accelerated pattern matching process are described in subsequent sections.

Figure 6:
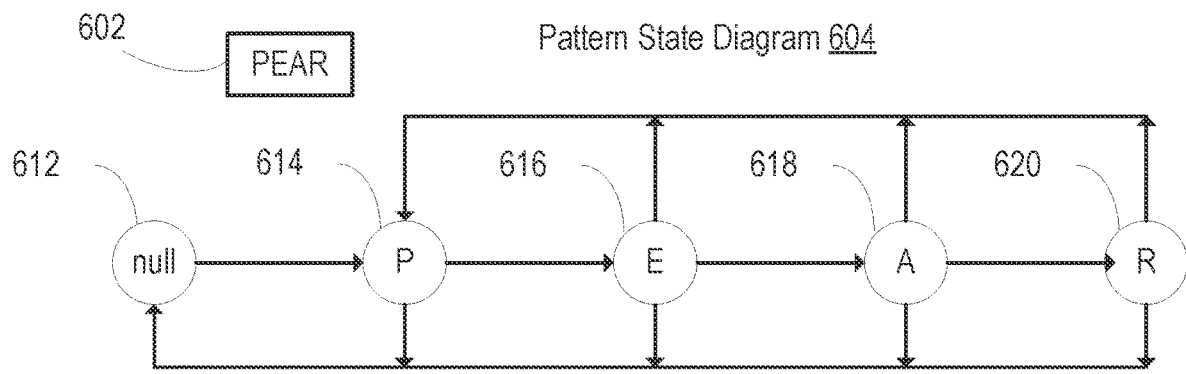
FIG. 6 illustrates a pattern state diagram and a corresponding pattern state table each representing a particular pattern in accordance with the disclosed embodiments.

FIG. 6 illustrates an example pattern state diagram and a corresponding pattern state table, each representing the same particular pattern 602. In the example of FIG. 6, a pattern 602 defines a sequence of character tokens corresponding to the word "PEAR". The defined pattern 602 may be one of many different patterns which a DPI microservice or other component is configured to search for in various input data items. For example, a DPI microservice may receive one or more network traffic messages, email messages, or file attachments, etc., and determine whether the pattern "PEAR", in addition to possibly many other patterns, is present in any part of the input data items.

As indicated above, a pattern, such as the pattern 602 defined by the pattern syntax "PEAR", may be represented as a finite state machine, as illustrated by the pattern state diagram 604. The pattern state diagram 604, for example, include one or more nodes, each representing a particular state, and one or more vertices connecting the nodes, where each vertex represents a transition from one state to another. For example, based on the states and state transitions represented in FIG. 6, a pattern processor 320 may start at a first state, and process an input data item one input element at a time in sequence, transitioning among the states according to the next character, to determine whether the corresponding pattern appears in the data item.

In the example of pattern state diagram 604, which is configured to determine whether the pattern "PEAR" exists in input data items, processing may begin at the "null" node 612. An input data item may then be processed one character, byte, or other data item unit at a time, and the current state may be updated based on each next character. According to pattern state diagram 604, for example, if the current state is the "null," and the next input character is a "P" character, a transition is made to the "P" state represented by node 614; otherwise, if the next character is any other character, the processing remains in the "null" state at node 612. If the current state is the "P" state and the next input character is an "E" character, a transition is made to the "E" state represented by the node 616; if the next input character is instead another "P" character, the processing remains at the "P" state represented by node 614; otherwise, if the next character is any other character, the processing returns to the "null" state at node 612. The processing continues in this manner transitioning from a current state to a next state based on subsequent input characters until no additional characters remain, until a pattern match is detected, or until some other condition occurs. In this way, the only way to reach the state "R" state represented by the node 620 is for the characters "P", "E", "A", and "R" to appear in that order, corresponding to an occurrence of the pattern "PEAR" in an input data item. As described in more detail hereinafter, the arrival at a particular state (e.g., arriving at the "R" state represented by the node 620) may signal a pattern "match" indicating that the pattern corresponding to the state diagram was detected in an input data item.

In one embodiment, a pattern state table 610 illustrates an example data structure representing the same finite state machine represented by the pattern state diagram 604. Similar to pattern state diagram 604, the pattern state table 610 comprises a set of table entries which collectively define the various states and state transitions involved in determining whether the pattern syntax "PEAR" exists in input data items. In general, a pattern state table may represent a way to store a corresponding finite state machine in memory of a computing device and which can be used by a DPI microservice to perform pattern matching.

In an embodiment, a pattern state table 610 comprises a plurality of table entries, each table entry specifying a current state 632, an input value 634, a next state 636, and a match indicator 638. For each current state 632, one or more next state 636 values correspond to a set of possible next input characters. For example, if the processing is currently at the "P" state, the set of possible next input characters for the purposes of matching the pattern "PEAR" includes a "P", an "E", or "default" (any other character), where each of the possible next input characters is associated with a transition to a particular next state. Referring again to the example where the processing is currently at the "P" state, if the next input character is an "E" character, the corresponding entry of the pattern state table 610 specifies that processing transitions to the "E" state.

In one embodiment, each table entry in the pattern state table 610 further includes a match indicator 638, where a match indicator indicates whether the state represented by the corresponding table entry represents a complete pattern match, or whether the state represents an intermediate state for matching one or more patterns. For example, because the pattern state diagram 604 represents the state diagram for the pattern syntax "PEAR", the table entry corresponding to the transition from the "A" state to the "R" state indicates that a match has occurred since this state transition occurs only if the full sequence of characters "PEAR" is detected in an input data item.

Figure 7:
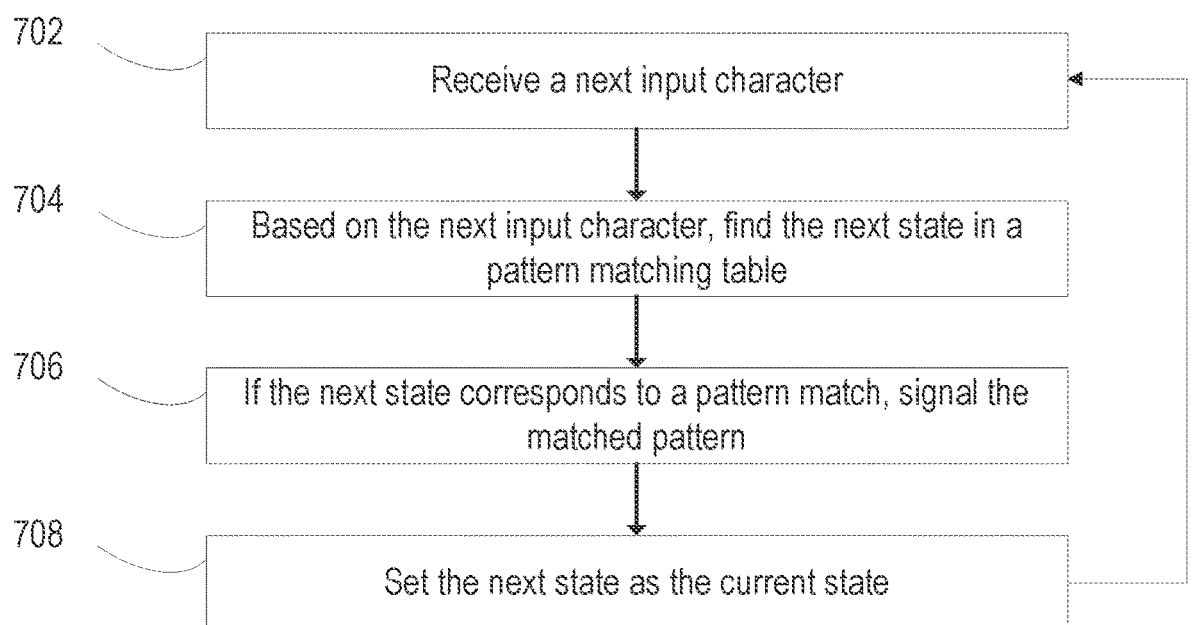
FIG. 7 is a flow diagram illustrating an example process for using a pattern state table to determine whether a pattern exist in a data item in accordance with the disclosed embodiments.

FIG. 7 is a flow diagram illustrating an example process for using a pattern state table to determine whether a pattern exists in an input data item. Although the flow diagram of FIG. 7 refers to "character" input, the example process is equally applicable to other types of non-character input.

At block 702, a next input character is received. For example, if a particular data item being processed comprises a HTTP request message including the line "GET/pub/WWW/TheProject.html HTTP/1.1", the message may be processed incrementally by receiving the first character "G", followed by the next character "E", followed by the next character "T", followed by a space character, and so forth, where each next character is received during a separate iteration of the example process depicted in blocks 702-708.

At block 704, based on the next input character received at block 702 and a current state, a next state is identified in a pattern state table. For example, the pattern state table may be similar to the pattern state table 610 depicted in FIG. 6. As depicted in pattern state table 610, for example, if the current state is "E" (indicating that the previous character input received was the character "E"), and the next input character is an "A", the pattern table may be searched to identify "A" as the next state (because the pattern table includes an entry which specifies a current state "E", an input value of "A", and a next state of "A").

At block 706, if the next state corresponds to a pattern match, the occurrence of the matched pattern is signaled. Referencing the example pattern state table 610 again, the occurrence of a matched pattern may be signaled if the "match" field is set to "yes" for the next state identified in block 704. In an embodiment, signaling a matched pattern may include setting a match flag, incrementing a counter, adding the matched pattern to a matched pattern list, causing display of one or more visual alerts, and/or performing any other processes.

At block 708, the current state is updated. For example, based on identifying the next state in the pattern state table at block 704, the current state may be set to the identified next state for subsequent processing steps. In an embodiment, the process illustrated in blocks 702-708 may be repeated until there are no additional input characters, until one or more particular patterns are matched, or until any other defined conditions are met.

Figure 8:
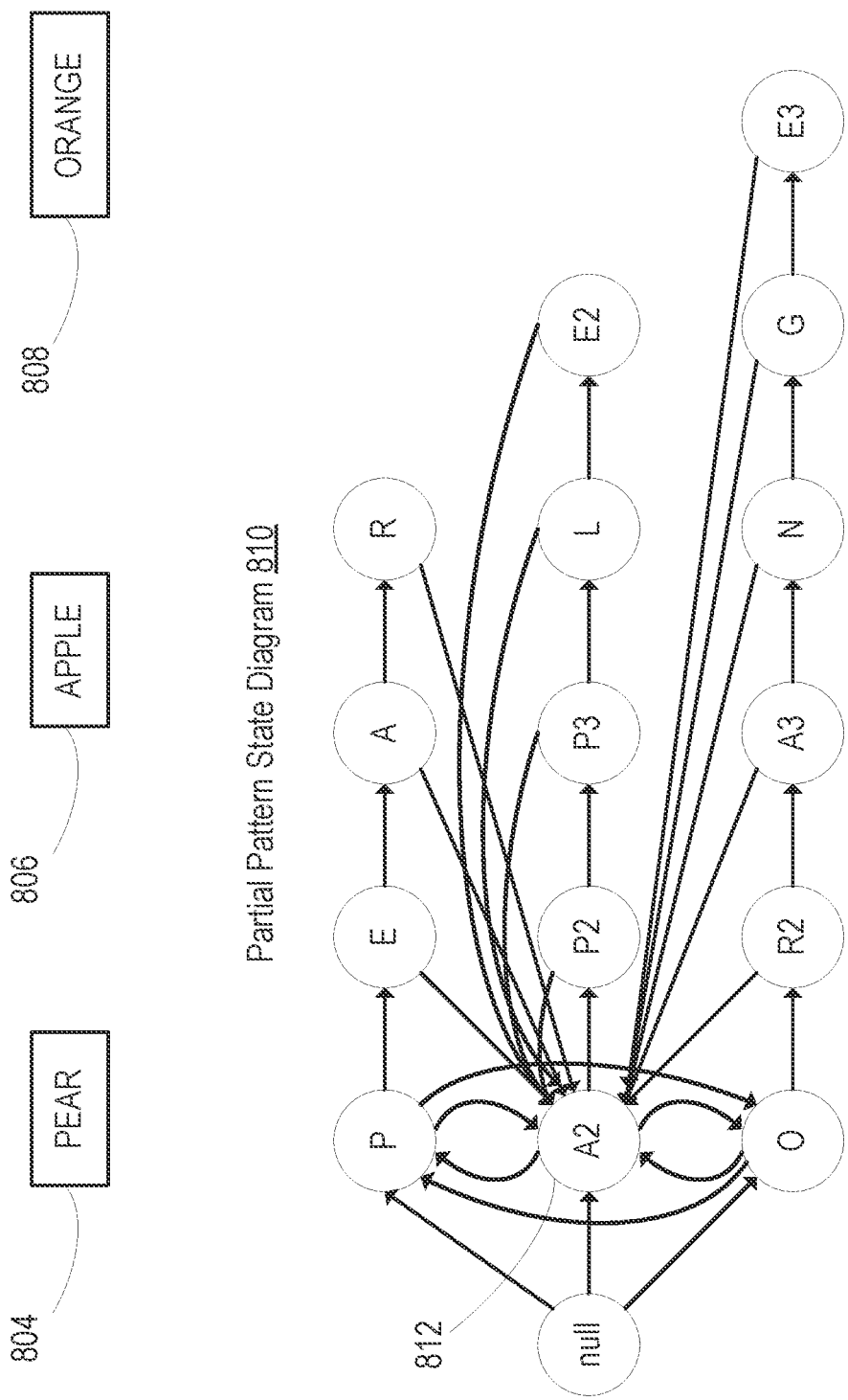
FIG. 8 illustrates a partial pattern state diagram representing a merged state diagram corresponding to three separate patterns in accordance with the disclosed embodiments.

FIG. 8 illustrates an example of a partial pattern state diagram, similar to the pattern state diagram 604 depicted in FIG. 6, representing a combined set of states and state transitions corresponding to a search for the presence of any of three separate patterns in a single pass through a data item. In particular, the partial pattern state diagram 810 illustrates an increase in the number of state transitions when searching for each of the patterns "PEAR", "APPLE", and/or "ORANGE", as compared to the pattern state diagram 604 searching for only the single pattern "PEAR". For example, the partial pattern state diagram 810 depicts a large number of state transitions involving the state "A2" represented by the node 812. The large number of state transitions involving the state "A2" is due in part to each of the patterns 804-808 including one or more "A" characters, where receipt of a next character input of "A" may possibly represent a part of matching any of the three patterns. The complexity of a state diagram representing a search for multiple patterns may increase even further when some or all of the patterns involve variable components.

In one embodiment, generating a combined pattern state diagram and/or combined pattern state table for a plurality of patterns may involve "merging" the set of state transitions representing a search for each of the patterns individually. For example, a complete set of states and state transitions for the partial pattern state diagram 810 may be generated by separately generating a complete pattern state table for each of the patterns "PEAR", "APPLE", and "ORANGE", and then merging the state tables into a single combined state table. The overlap of constituent characters and possible states of partial match generally increases substantially as the number of patterns grows.

Figure 9:
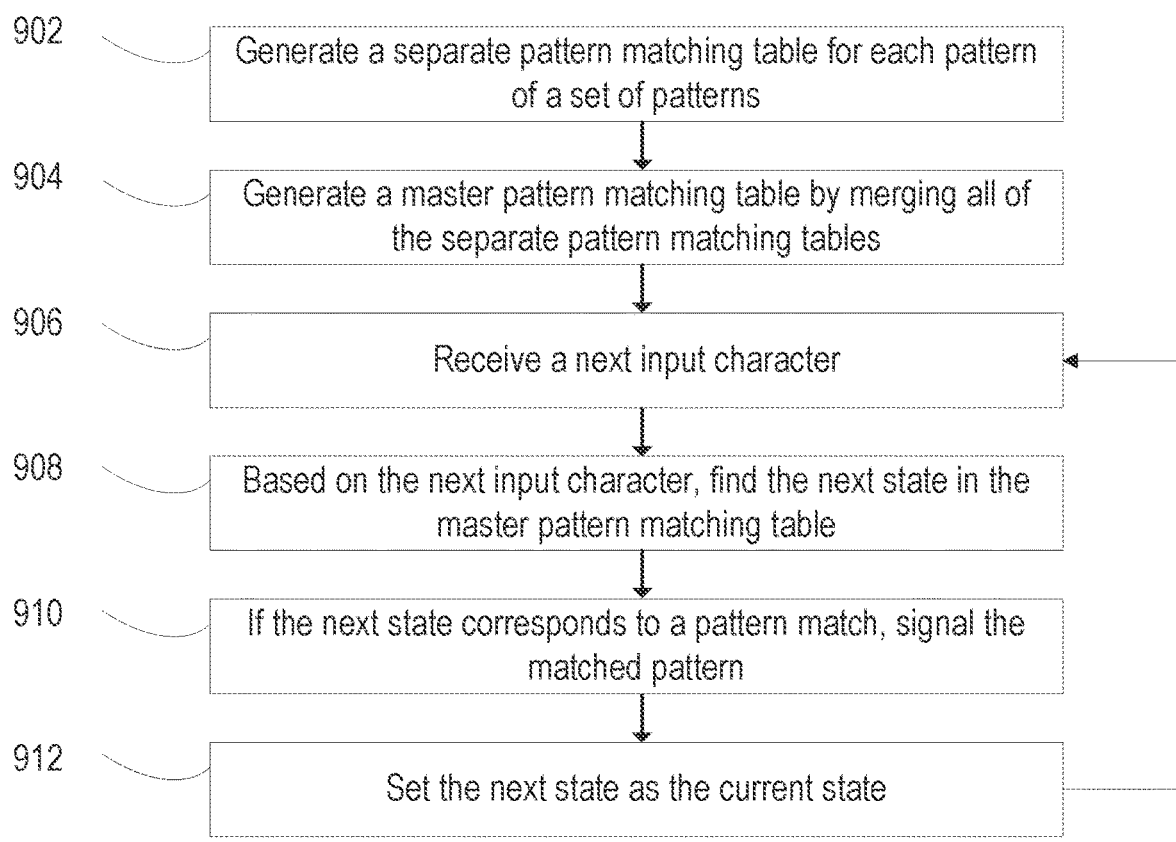
FIG. 9 is a flow diagram illustrating an example process for generating and using a merged pattern state table to determine whether one or more patterns exist in a data item in accordance with the disclosed embodiments.

FIG. 9 is a flow diagram illustrating an example process for generating a combined pattern state table for a plurality of patterns, and for using the combined pattern state table to search for one or more of the plurality of patterns in input data items. At block 902, a separate pattern table is generated for each pattern of the set of patterns. For example, each pattern of a set of input patterns may be represented as a set of state and state transitions which determine whether the pattern is matched based on an input character sequence, as described above in reference to FIG. 6-8. At block 904, a master pattern table is created by merging together all of the separate pattern tables. For example, the set of states and state transitions comprising each individual pattern matching table may be combined into a single "master" pattern matching table, where the master pattern matching tables indicates when a match occurs for any of the patterns included in the master table. At blocks 906-912, steps similar to those described above in reference to FIG. 7 may be performed to determine the presence of one or more of the patterns represented in the master pattern matching table based on an input data item.

3.2. Pattern Matching Using State Leaps

As illustrated above, the complexity of a pattern matching table and corresponding pattern matching process may increase significantly as the number of search patterns increases. According to an embodiment, a process for pattern matching a set of patterns can be accelerated by dynamically "state leaping" among a set of pattern classes, where each pattern class represents a defined subset of the complete set of patterns. As used herein, a "state leap" generally involves searching a data item for a set of patterns represented by one pattern matching table and, in response to detecting the presence of one or more particular patterns from the pattern matching table in a first portion of a data item, selecting another pattern matching table to use for processing a second portion of the data item. For example, a pattern matching process may begin processing a data item using a first pattern matching table and detect one or more particular patterns early on and which indicate that the data item likely represents a particular type of HTTP message. In response to detecting the one or more particular patterns in the first portion of the data item, the pattern matching process may "state leap" to a separate pattern class table which includes only those patterns relevant to the particular type of HTTP message. Thereafter, the remaining portion of the data item may be processed using the selected pattern class table until the data item is completely processed, or until another "state leap" to a different class table is triggered. As described in more detail hereinafter, a speed and efficiency with which pattern matching is performed can be greatly improved by dynamically state leaping between various pattern classes during a pattern matching process since each pattern class generally represents a smaller and less complex set of patterns relative a complete set of input patterns. In many cases, partitioning a set of R regular expressions with a regular expression table of size S into two tables of R/2 regular expressions may yield tables of sizes S/10 or smaller.

FIG. 10 illustrates an example of an enhanced pattern state table, where each table entry includes a new callback function identifier field. Similar to the pattern state table 610 of FIG. 6, each table entry in the pattern state table 1010 comprises a number of fields including a current state 1012, an input value 1014, a next state 1016, and a match identifier field 1018. In one embodiment, the pattern state table 1010 further includes a callback function identifier field 1020. In general, a DPI microservice or other process may use the pattern state table 1010 to detect patterns in input data items in a manner similar to that of pattern state table 1010; however, in addition to the ability to determine whether a current state corresponds to a pattern match (e.g., based on the match identifier field 1018), each table entry may further indicate whether to invoke a particular "callback function." In an embodiment, a callback function generally enables a pattern matching process to dynamically switch to one of a plurality of different pattern class state tables if one or more specified conditions are met. The callback function identifier field 1020 may itself specify one or more transition conditions and a pattern class state table for the transition, or the callback identifier field may reference a separate external function that determines whether to transition to a separate pattern class state table.

Figure 11:
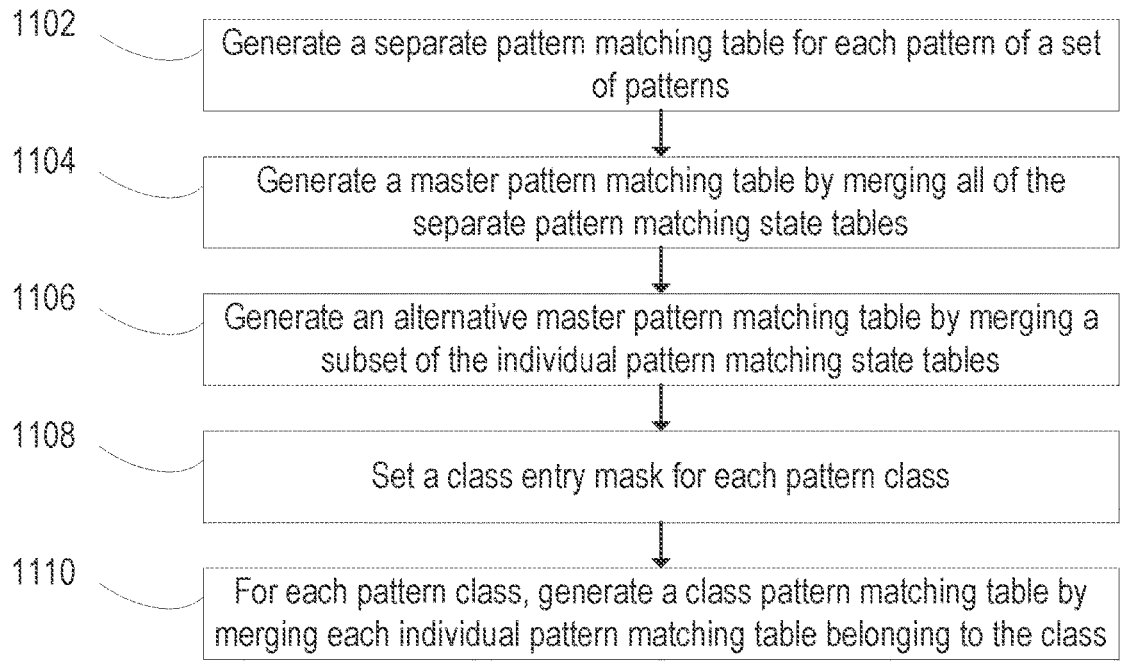
FIG. 11 is a flow diagram illustrating an example process for generating a master pattern matching table, an alternative master pattern matching table, and a plurality of class pattern matching tables in accordance with the disclosed embodiments.

FIG. 11 is a flow diagram illustrating an example process for generating a master pattern matching table, an alternative master pattern matching table, and a plurality of class pattern matching tables. At block 1102, a separate pattern matching table is generated for each pattern of a set of input patterns. In an embodiment, the set of input patterns may represent all patterns for which a DPI microservice is to search for in input data items, and which may span different types of input data items and data item contexts. For example, the set of input patterns may include patterns for detecting various types of malicious network traffic, spam and other unwanted email messages, virus signatures, and so forth. A separate pattern matching table may be generated for each pattern, for example, as illustrated by the pattern state table 610 for the pattern 602.

At block 1104, a master pattern matching table is generated by merging all of the individual pattern matching tables created at block 1102. For example, a merged pattern matching table may be created by merging all of the states and state transitions comprising each of the individual pattern matching tables created at block 1102 into a single "master" pattern matching table.

At block 1106, an alternative master pattern matching table is generated by merging a subset of the pattern matching tables generated at block 1102. For example, instead of merging every pattern matching table generated at block 1102, as in block 1104, only a selected subset of patterns may be merged into an alternative master pattern table. The selected subset of patterns may, for example, correspond to a set of "top-level" patterns each of which identifies an initial pattern class for state leaping. Additional details related to the creation and use of an alternative master pattern matching table are described hereinafter in Section 3.4.

At block 1108, a class entry mask is set for each pattern class of one or more pattern classes. For example, referring again to FIGS. 4, 5, each pattern entry (e.g., each of pattern entries 410-420) may include a pattern class list indicating one or more classes to which the pattern belongs. Furthermore, a separate class table (e.g., class table 502) may include one or more pattern class entries, where each pattern class entry represents a defined pattern class. For a specific pattern class, a pattern table corresponding to those patterns belonging to that pattern class can be used when the conditions of the class entry mask have been met.

In one embodiment, each pattern class entry in a pattern class table includes a class entry mask (e.g., a class entry mask 514 for the pattern class entry 510), where the class entry mask specifies one or more patterns which, when matched during a pattern matching process, indicates that an associated class callback function is to be invoked. For example, if a "FRUITS" pattern class represents a pattern class including each of the patterns "PEAR", "ORANGE", and "APPLE", a class entry mask for the class may be the pattern "FRUIT". In this example, if the pattern "FRUIT" is matched when processing a particular data item, then a callback function associated with the "FRUIT" pattern class may be invoked, where the callback function may determine whether a state leap transition to the "FRUIT" pattern class matching is to occur. Thus, the class "FRUIT" (including the patterns "PEAR", "ORANGE" and "APPLE") may be used for pattern matching when the pattern mask "FRUIT" is detected in an input stream. Those patterns (including any memory space required for those patterns in a pattern table) are not required until the conditions of that class entry mask are met.

At block 1110, for each pattern class, a pattern class matching table is generated by merging each of the pattern matching tables for patterns belonging to pattern class. Referring again to the example above of a "FRUITS" pattern class including each of the patterns "PEAR", "ORANGE", and "APPLE", a pattern class matching table may be generated by merging together each of the individual pattern matching tables generated for the patterns "PEAR", "ORANGE", and "APPLE" at block 1102.

Figure 12:
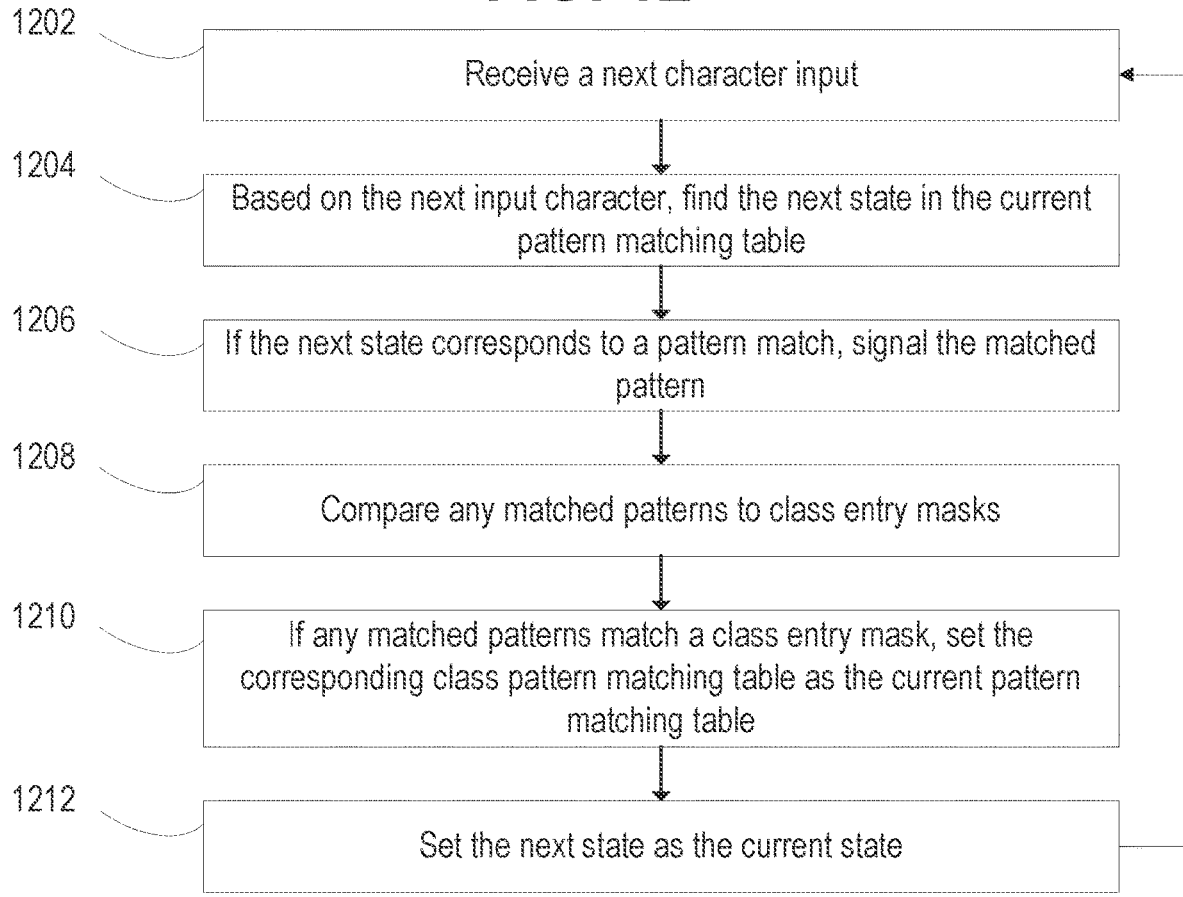
FIG. 12 is a flow diagram illustrating a process for performing pattern matching using a master pattern matching table, an alternative master pattern matching table, and/or a plurality of class pattern matching tables in accordance with the disclosed embodiments.

FIG. 12 is a flow diagram illustrating an example process for performing pattern matching using a master pattern matching table, an alternative master pattern matching table, and/or a plurality of class pattern matching tables. For example, the process described in FIG. 12 may use a set of pattern matching tables as generated by the example process described above in reference to FIG. 11.

At block 1202, a next input character is received. Similar to the process described in reference to FIG. 7, if a particular input data item processed comprises a HTTP request message including the line "GET/pub/WWW/TheProject.html HTTP/1.1", for example, the data item may be processed by first receiving the next character "G", followed by the next character "E", followed by the next character "T", followed by a space character, and so forth, where a next character is received at each iteration of the example steps depicted by blocks 1202-1212.

At block 1204, based on the next character input received at block 1202 and a current state, a next state is identified in the current pattern matching table. In an embodiment, a "current" pattern matching table may refer to any of the master pattern matching table, alternative master pattern matching table, or any one of the plurality of class pattern matching tables. For example, a pattern matching process may start by initially using a master pattern matching table or alternative master pattern matching table. As described in the subsequent steps, based on detecting a pattern that is further determined to match one or more class entry masks, the pattern matching process may dynamically state leap to a different pattern matching table for the purposes of processing any remaining portion of the data item.

At block 1206, if the next state corresponds to a pattern match, the occurrence of the matched pattern is signaled. For example, in reference to the example pattern state table 610, the occurrence of a matched pattern may be signaled if the "match" field is set to "yes" for the next state identified in block 1204. In an embodiment, signaling a matched pattern may include setting a match flag, incrementing a counter, adding the matched pattern to a matched pattern list, causing display of one or more visual alerts, and/or performing any other processes.

At block 1208, any patterns determined to match at block 1206 are compared to the set of class entry masks (e.g., the set of class entry masks set at block 1108 in FIG. 11). For example, if the next state identified at block 1204 is determined to represent a pattern match at block 1206, the matched pattern may be compared against each of the class entry masks (e.g., class entry masks 514 . . . 524) of a class table 502.

At block 1210, if any of the matched patterns are determined to match a class entry mask at block 1208, a pattern class matching table associated with the matched class entry mask is set as the current pattern matching table. For example, if the master pattern matching table, alternative master pattern matching table, or a particular class pattern matching table was previously set as the current pattern matching table, and if the particular class entry mask is determined to match at block 1206, the corresponding class pattern matching table may then be used to search for patterns in any remaining portion of the data item.

In an embodiment, a process for setting a new pattern matching table as the current table, or performing a "state leap," may involve any number of processes. For example, setting a new pattern matching table as the current table may involve removing the current table from memory, and loading the new pattern matching table into memory. In this manner, an often smaller and more efficient class pattern matching table may be loaded into memory and used when particular class entry mask pattern is encountered in first portions of a data item, where any remaining portion of the data item may be processed using only the class pattern matching table unless a subsequent "state leap" condition is encountered.

At block 1212, the current state is updated. For example, based on identifying a next state by identifying an appropriate entry in the current pattern matching table at block 1204, the current state may be set to the identified next state for subsequent processing steps. As depicted in FIG. 12, the process illustrated in blocks 1202-1208 may be repeated until there are no additional input characters, until one or more particular patterns are matched, or until any other defined conditions are met.

Referring again to the example of a pattern matching process including a "FRUIT" pattern class, the process may begin searching for patterns in an input data item using a master pattern matching table, where the data item is processed starting from the beginning of the data item and proceeding to the end of the data item. In a hypothetical example, the pattern matching process may determine that the pattern "FRUIT" is matched at a location approximately 10% of the way into processing the data item, and the process may further determine that the "FRUIT" pattern matches the class entry mask for the "FRUITS" pattern class. Based on matching the "FRUITS" class entry mask, the "FRUITS" pattern class matching table is set to the current pattern matching table and the remaining 90% of the file may be processed using the "FRUITS" pattern class matching table instead of the master pattern matching table. If during processing the remaining 90% of the file another class entry mask is matched, yet another pattern class matching table may be selected to process any remaining portion of the file, and so forth. In this manner, the pattern matching process may selectively "state leap" between various pattern class matching tables depending on a pattern "context" detected at earlier portions of the data item, thereby potentially reducing the number of patterns to be matched and accelerating the overall pattern matching process.

Figure 13:
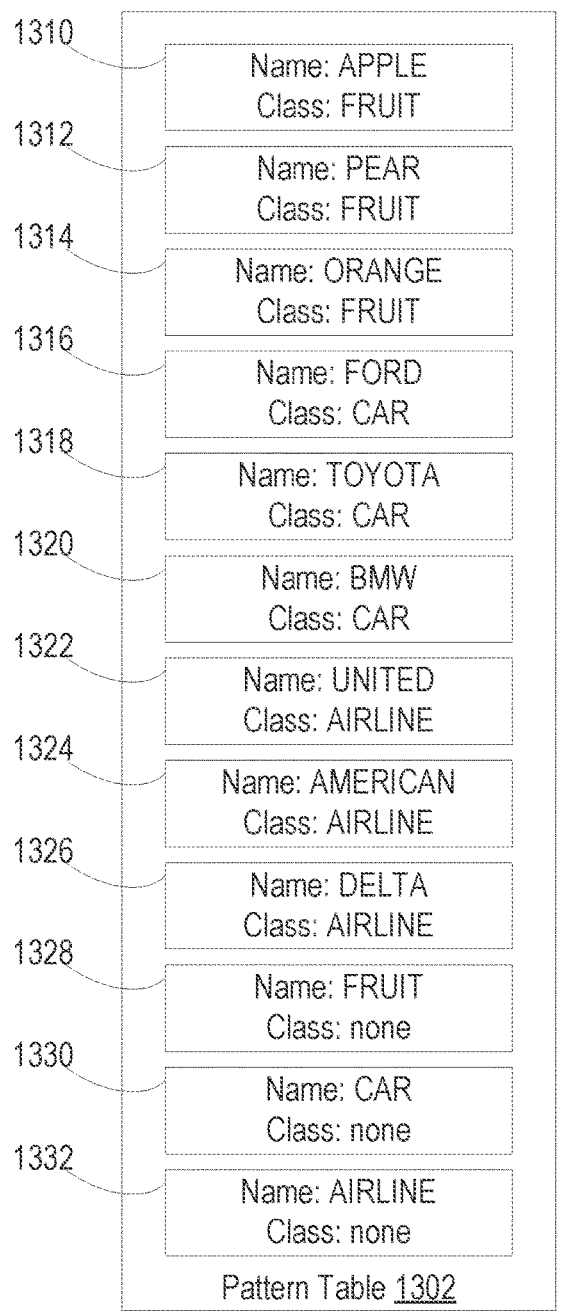
FIGS. 13, 14 are block diagrams illustrating another example pattern table and an example class table, respectively, in accordance with the disclosed embodiments.
Figure 14:
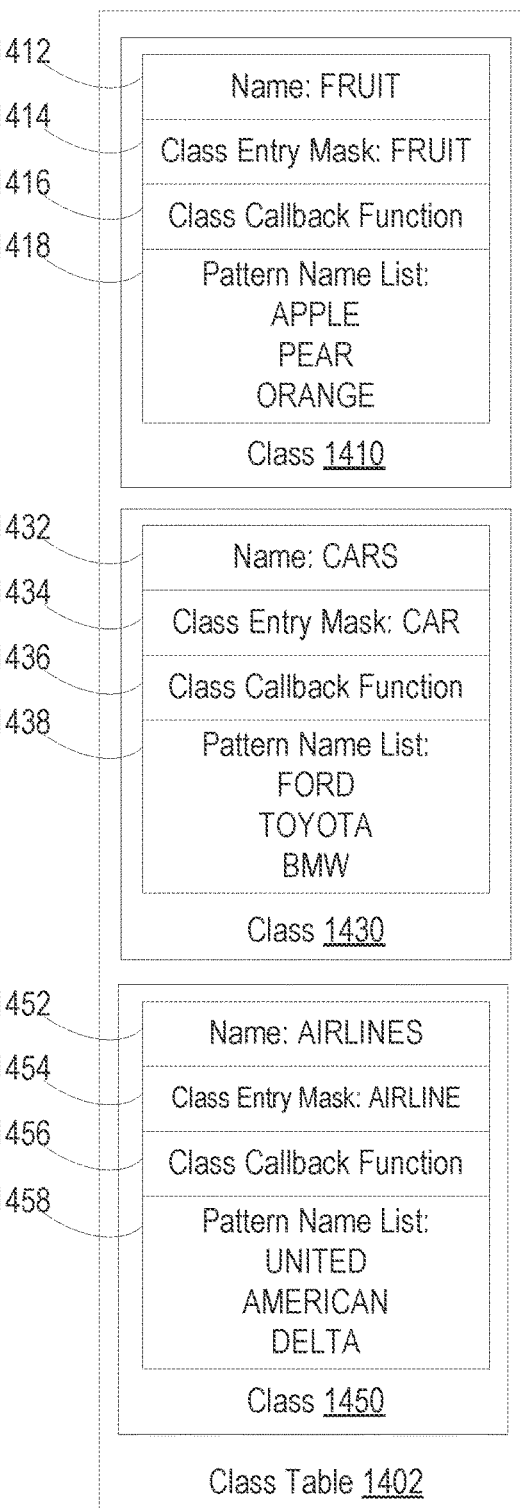

To further illustrate an example relationship between a pattern table and a pattern class table, FIG. 13 illustrates an example "master" pattern table 1302, and FIG. 14 illustrates an example pattern class table 1402. For example, master pattern table 1302 comprises twelve (12) different patterns labeled 1310-1332, and pattern class table 1402 comprises three (3) pattern class entries 1410, 1430, and 1450. The master pattern table 1302 and pattern class table 1402 each depict a limited number of entries for illustrative purposes only; actual embodiments may include any number of entries in each table.

In an embodiment, master pattern table 1302 includes several pattern entries (e.g., entries 1310-1326), each of which is associated with a particular class. For example, each of the entries 1310-1314 (corresponding to the patterns "APPLE", "PEAR", and "ORANGE", respectively) is associated with a "FRUIT" pattern class. Similarly, each of the entries 1316-1320 (corresponding to the patterns "FORD", "TOYOTA", and "BMW", respectively) is associated with a "CAR" pattern class. Each of the entries 1322-1326 (corresponding to the patterns "UNITED", "AMERICAN", and "DELTA", respectively) is associated with an "AIRLINE" pattern class.

In an embodiment, the master pattern table 1302 further includes three (3) patterns, 1328-1332, which are not associated with any class. For example, each of the pattern entries 1328-1332 is associated with a label (e.g., "FRUIT", "CAR", and "AIRLINE"), but with a class identifier of "none". In this example, each of the patterns in the master pattern table which do not belong to any particular class may represent "top-level" patterns and which serve as "gateway" patterns to one or more class tables. In the example of FIGS. 13, 14, the pattern table entry 1328 corresponding to the pattern "FRUIT" also corresponds to the class entry mask for the "FRUIT" pattern class entry 1410. Thus, if a pattern matching process begins processing a data item using the master pattern table 1302, and the "FRUIT" pattern table entry 1328 is found in the data item, the process may then match the "FRUIT" pattern against the class entry mask for the pattern class entry 1410 and select the class pattern matching table associated with the pattern class entry 1410 as the current pattern matching table. Although in the example of FIGS. 13, 14 each of the "top-level" pattern entries 1328-1332 corresponds directly to one of the class entry masks from the pattern class table 1402, in other examples, some "top-level" patterns may not directly match any class entry mask.

FIG. 14 illustrates a corresponding pattern class table 1402. As depicted in the example of FIG. 14, a pattern class table 1402 includes three (3) separate pattern class entries 1410-1450. In an embodiment, each class entry includes a name, a class entry mask, a class callback function, and a pattern list. For example, pattern class entry 1410 includes a class name 1412 with the associated label "FRUIT", a class entry mask 1414 specifying the pattern "FRUIT", a class callback function 1416, and a pattern name list 1418 (e.g., identifying the patterns "APPLE", "PEAR", and "ORANGE").

As described above, each pattern class entry in the pattern class table 1402 includes a class entry mask. For example, the pattern class entry 1430 named "CARS" includes a class entry mask specifying the pattern "CAR". Thus, for a pattern matching process using this pattern matching table (e.g., pattern state table 1010) including the callback function identifier field, as a data item is parsed, if the pattern "CAR" is matched in a data item, the matching state may identify a class callback function. In this example, the class callback function is the "CAR" class callback function 1436. In an embodiment, the "CAR" class callback function may be configured to perform any number of operations including, for example, confirming that the "CAR" pattern was matched, determining whether one or more other particular patterns were previously matched, determining whether one or more other particular patterns have not previously matched, determining a location within the data item where the pattern was matched, etc.

In an embodiment, the "CAR" class callback function 1436 may be further configured to state leap to a particular pattern class matching table (e.g., to a "CARS" pattern class matching table) if one or more conditions are met, as described above. Referring again to the "CARS" pattern class example above, in response to a state leap to the "CARS" pattern class matching table, instead of processing any remaining portion of the data item by searching for patterns from the master pattern table 1302, a more specific pattern class matching table comprising only the patterns "FORD", "TOYOTA", and "BMW" may be used.

To further illustrate a pattern matching process utilizing the master pattern table 1302 and pattern class table 1402, assume that a DPI microservice receives a document, and it known that the subject matter of the document pertains to one of airlines, cars, and fruits. More specifically, assume that the subject matter of the document relates to a specific type of either airlines, cars, or fruits. For example, the subject matter of the document may relate airlines, and more specifically to Delta airlines. If the document is parsed from beginning to end, it is likely that one of the "top-level" class patterns (e.g., "FRUIT", "CAR", or "AIRLINE") may be encountered early in the document, and the remainder of the document may likely contain one or more of the patterns associated specifically with the encountered pattern class. Thus, when an entry mask corresponding to a pattern class is encountered in the document, the pattern matching process can focus on the subset of patterns associated with the class, and the rest of the patterns can be ignored. Furthermore, any number of levels in a pattern class hierarchy may be specified. For example, referring again to FIG. 13, a subclass may be generated for the pattern "FORD" and include a set of patterns including "EXPLORER", "PINTO", and "TAURUS", and so forth.

Although many of the examples described above use common words for patterns, similar techniques may be used to process classes of network traffic and other data comprising other types of patterns. For example, in a network security system, one particular class may include patterns of interest to be found in HTTP messages, another class may include patterns to be found in FTP messages, and yet another class may include patterns to be found IMAP messages, etc. In this example, if a class entry mask for the HTTP class is encountered near the beginning of an input data item, the remainder of the data item can be analyzed using only the patterns from the HTTP class, and excluding all of the patterns from the FTP class, IMAP class, and other classes comprising patterns unrelated to HTTP messages. If the patterns included in the HTTP class represent only a small percentage of the total number of patterns, for example, and detection of the HTTP pattern class occurs relatively early in processing the data item (e.g., as a result of detecting one or more patterns present in most or all HTTP messages), the vast majority of patterns can be ignored for most of the pattern matching process.

It is noted that the processes described above may result in some patterns being missed when processing a data item. For example, a malformed data item may initially appear to be one type of data, but actually contain other types of data (e.g., a malformed network message header may cause one type of network message to appear as another). Referring to the example pattern table and pattern class table depicted in FIGS. 13 and 14, a data item may initially include a pattern corresponding to one class (e.g., "FRUIT"), however, the remaining portion of the data item may contain content more specifically related to cars and not types of fruit. In these instances, the master pattern table can be used as backup to check for missed patterns. For example, if a pattern class is matched in a first portion of a data item, but no pattern class-specific patterns are matched in a remaining portion of the data item, the data item may be re-checked without state leaping to the particular pattern class to determine whether other patterns may have been missed as a result of the state leap.

Figure 15:
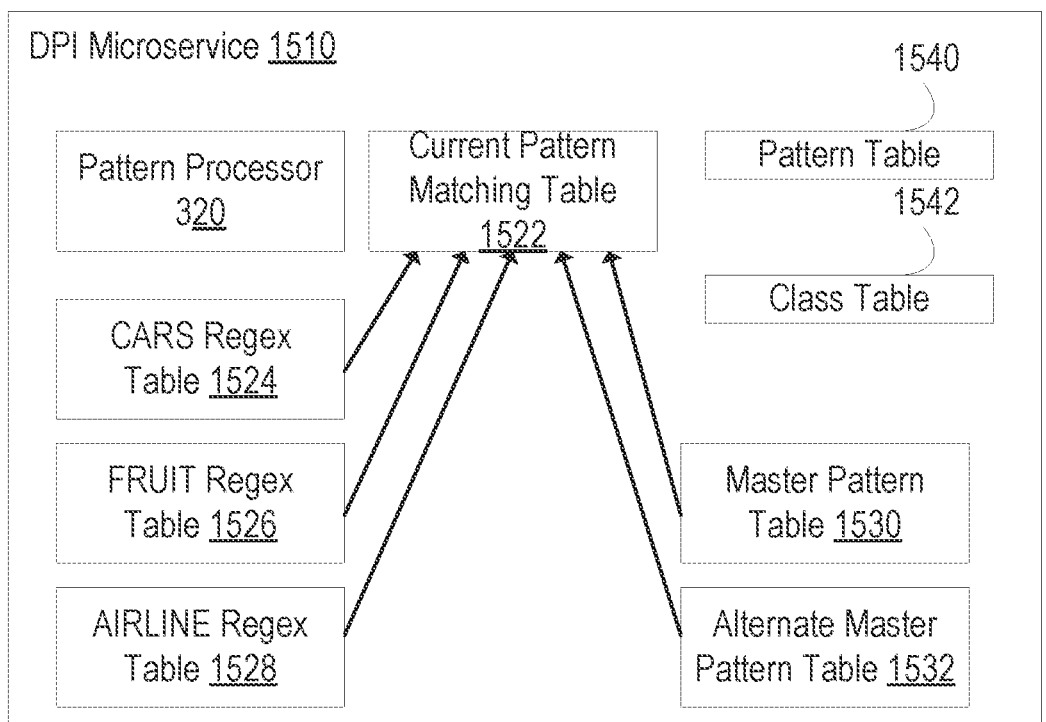
FIG. 15 is a block diagram illustrating components of an example DPI processing microservice in accordance with the disclosed embodiments.

FIG. 15 illustrates an example DPI microservice that includes components for enhanced regular expression matching, as illustrated in the examples described above. In an embodiment, a DPI microservice 1510 comprises a pattern processor 320, a master pattern matching table 1530, an alternative master pattern matching table 1532, one or more pattern class matching tables 1524-1528, a current pattern matching table 322, a pattern table 1540, and a class table 1542.

In one embodiment, a pattern processor 320 represents a process for performing enhanced pattern matching functions. A pattern processor 320 may, for example, search for patterns in input data items using a current pattern matching table 1522. As described above in reference to the example flow diagram of FIG. 12, the current pattern matching table 1522 may, at any particular point in time, be one of the master pattern matching table 1530, the alternative master pattern matching table 1532, or one of the pattern class matching tables 1524-1528. For example, a pattern processor 320 may start processing a data item using the master pattern matching table 1530 (or alternative master pattern matching table 1532), and may subsequently state leap to any of the pattern class matching tables 1524-1528 in response to matching one or more particular patterns from the current pattern matching table 1522 in the input data item.

3.4. Alternative Pattern Matching Tables

In one embodiment, in addition to or instead of a master pattern matching table, a DPI microservice may generate and use an "alternative" master pattern matching table for use during pattern matching processes. At a high level, an alternative master pattern matching table may comprise a subset of the patterns included in a master pattern matching table, where the selected subset of patterns corresponds to a set of "top-level" patterns in a pattern class hierarchy.

For example, a master pattern matching table may include a large number of entries representing all possible patterns to be searched. However, if a set of pattern class matching tables have been generated, it may be more efficient to begin a pattern matching process with a set of patterns representing a "top-level" of the class hierarchy, for example, a set of patterns which are not a member of any particular class, but which may lead to one or more of the pattern class tables. For example, in reference to FIG. 13, a separate alternative master pattern matching table may be generated for the pattern entries 1328-1332, each of which is not a member of any pattern class (as indicated by the class value of "none"). In this example, a DPI microservice can process a data item by initially searching the data item for only those three patterns. If one of those three patterns is found in the data item, the DPI microservice can then state leap to a corresponding pattern class matching table.

In one embodiment, a master pattern table may be programmatically partitioned into an alternative pattern matching table and one or more pattern class tables. For example, a DPI microservice or other component may monitor the pattern matching process over a set of sample data items. Based on the monitoring, the DPI microservice may track which patterns and how often particular patterns from the master pattern table are matched, including an order in which patterns are matched relative to one another. For example, a profiling component may determine which patterns are matched most frequently for particular types of data items (e.g., one set of patterns may frequently match when the data item is an email message, while another set of patterns frequently match when the data item is an HTTP request message, etc.), and also which patterns serve as "gatekeepers" to other patterns (e.g., certain patterns may match only if one or more other patterns previously matched in the same data item). This information can then be used to determine class groupings, where frequently co-occurring patterns are grouped into classes and "gatekeeper" patterns serve as class entry masks for particular classes. One of the top-level "gatekeeper" patterns may then be used to form an initial alternative master pattern matching table, as described above.

3.3. Pattern Matching Using Pattern Functions

The examples described in the preceding sections relate generally to techniques for determining the presence of one or more patterns in data items. As indicated, this process may involve searching for the patterns by receiving one character, byte, or other element of the data item at a time starting from the beginning of the data item and proceeding to the end of the data item, and determining whether any portion of the received input sequence matches any of the patterns of interest. Data items generally may be processed in this way because many patterns potentially can be found at any location within the data item. For example, one pattern matching process may search for a number of words and phrases which occur frequently in spam email messages, where the patterns may be found in any of the body of the email message, the subject line, the email message header fields, etc.

However, some patterns may specify a sequence of tokens which may be found, if present at all within a given data item, only at one or more particular locations within the data item. For example, one particular pattern may specify a sequence of tokens that can be found, if present at all, only as the value for a particular field of a particular type of network message, where the particular field generally is found at the same location within each instance the particular type of network message. In one embodiment, such patterns specifying one or more particular locations within data items where the associated sequences of tokens may be found are referred to herein as "fixed offset" patterns. For example, a "fixed offset" pattern may include syntax indicating one or more particular locations within a data item (e.g., 10 characters from the beginning of the data item, within the last 50 bytes of the data item, etc.) where the pattern may be found.

According to one embodiment, to accelerate pattern matching data items against sets of patterns which include one or more fixed offset patterns, one or more "pattern functions" may be generated for the fixed offset patterns. At a high level, a pattern function represents a code segment, script, or any other executable instructions configured to determine whether a particular pattern exists at one or particular locations within a data item. In particular, each pattern function may use one or more processes other than regular expression matching the pattern against the entire data item to determine whether the pattern exists in the data item. For example, a pattern function may use information about the location of the fixed offset to perform a direct string comparison or other similar function directly against the data at the one or more fixed offset location within the data item.

By processing the fixed offset patterns against only the fixed offset locations in the data item, a determination of the patterns presence in the data item typically can be performed significantly faster than if the pattern was included as part of a larger regular expression matching process. Furthermore, by removing patterns determined to include a fixed offset from the overall set of patterns to be matched, the size of the pattern matching tables generated for other variable offset patterns can be reduced, thereby accelerating the regular expression matching or other processes used to pattern match the variable offset patterns.

Figure 16:
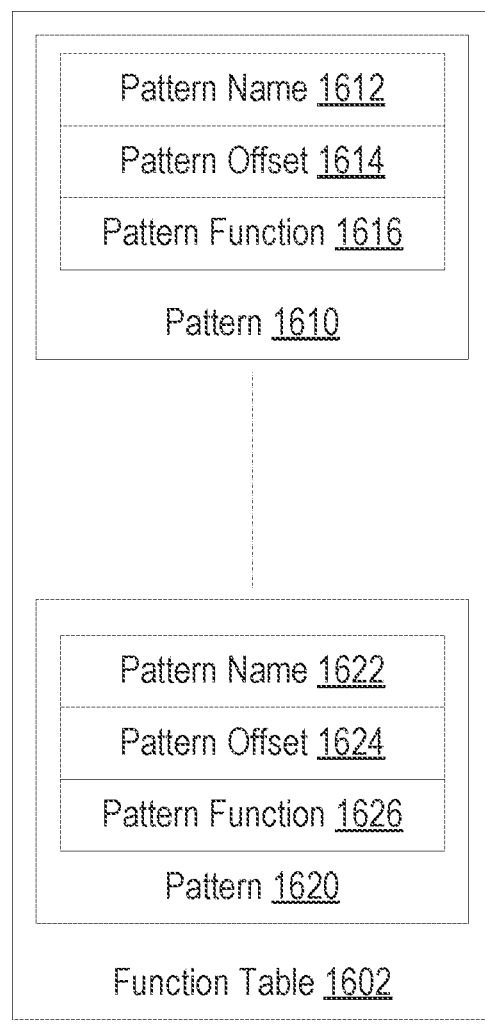
FIG. 16 is a block diagram illustrating an example function table in accordance with the disclosed embodiments.

FIG. 16 is a block diagram illustrating an example function table. In an embodiment, a function table 1602 includes one or more function table entries 1610-1620. Each entry may comprise a pattern name, pattern offset, and pattern function. For example, the pattern entry 1610 includes a pattern name 1612 (e.g., which may match a pattern name from a corresponding pattern table), a pattern offset 1614 (e.g., identifying one or more locations in a data item where the associated pattern may exist), and a pattern function 1616 (e.g., identifying a function configured to compare the associated pattern against data located at the pattern offset locations within data items to determine whether the pattern exists). For example, a DPI microservice may generate a function table based on identifying one or more fixed offset patterns from a set of patterns, as described below in reference to FIG. 17.

Figure 17:
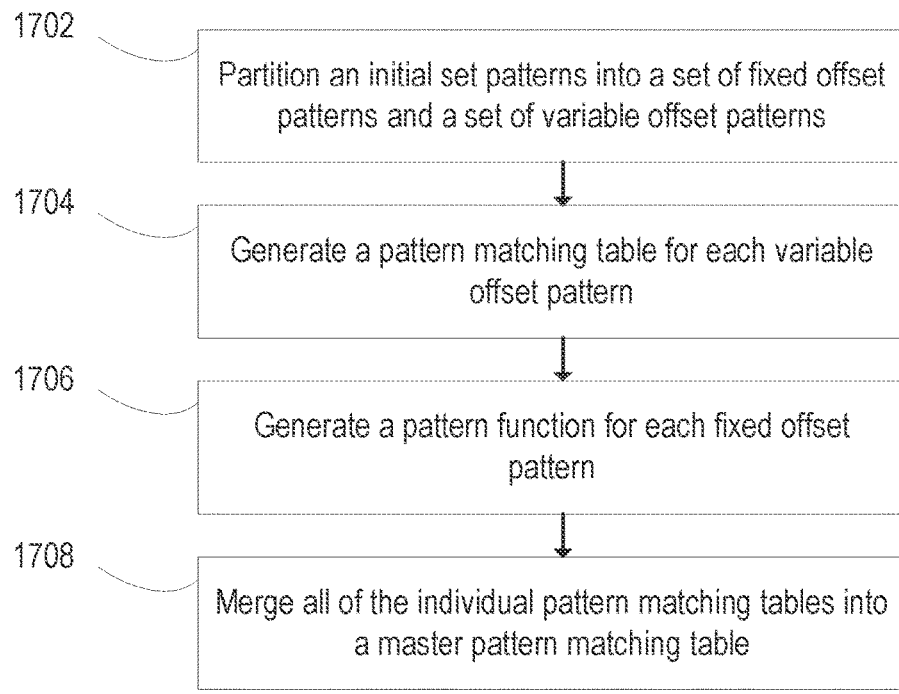
FIG. 17 is a flow diagram illustrating an example process for generating a set of pattern functions and a separate pattern matching table from a set of patterns in accordance with the disclosed embodiments.

FIG. 17 is a flow diagram illustrating an example process for generating one or more pattern functions and one or more separate pattern matching tables from a set of patterns. At block 1702, an initial set of patterns is partitioned into a set of fixed offset patterns and a set of variable offset patterns. As indicated above, a "fixed offset" pattern generally refers to a pattern including an identifier of a particular location in a data item, a set of locations within in a data item, one or more location ranges within a data item, or any other location specific syntax. As one example, one fixed offset pattern may specify a search for the sequence of tokens "HOST" appearing seven (7) characters from the beginning of a data item. For example, a particular network protocol may specify that validly formatted protocol messages include a "HOST" field at a location in the message that begins seven (7) characters from the beginning of the data. As another example, a fixed offset pattern may specify a search for a range of IP addresses at a location that is either five (5) characters from the beginning or twenty (20) characters from the beginning of a data item. As yet another example, a fixed offset pattern may specify a search for email addresses which appear within the first fifty (50) characters of data items, only within the last one hundred characters, only within the range of characters starting at 200 and ending at 400 or the range of characters starting at 600 and ending at 800, etc.

In one embodiment, the set of fixed offset patterns may be identified using a pattern matching process against the initial set of patterns. For example, a regular expression matching process may be used to search the patterns for those patterns which include one or more syntax elements indicating that the pattern may be located at one or more fixed locations within data.

Figure 18:
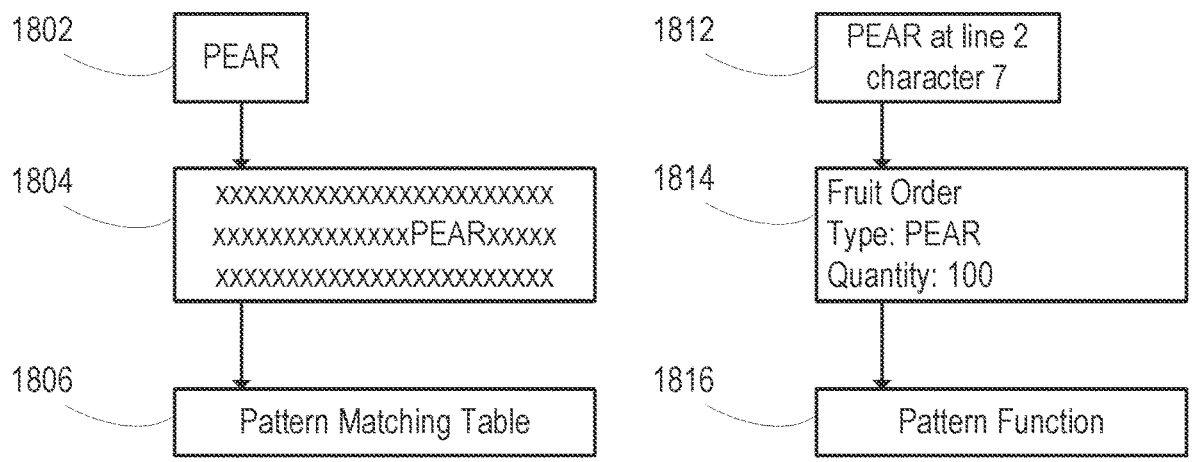
FIG. 18 illustrates separate examples of searching for a variable offset pattern and a fixed offset pattern in a data item in accordance with the disclosed embodiments.

FIG. 18 illustrates separate examples of searching for a variable offset pattern and a fixed offset pattern in a data item. For example, a variable offset pattern 1802 indicates that the pattern "PEAR" may exist at any location in a date item (e.g., because the pattern syntax does not specify any fixed offset location information). The data item 1804, for example, illustrates a data item where the string "PEAR" exists at an arbitrary location within the data item. As described in reference to FIG. 9, in one embodiment, a pattern matching table 1806 may be generated for the variable offset pattern 1802 and used to search the data item 1804, character-by-character from the beginning of the data item to the end, for the presence of the pattern "PEAR" (and possibly many other patterns at the same time).

As another example, a fixed offset pattern 1812 specifies a search for the pattern "PEAR", but further specifies that the pattern is to be matched against the data beginning at line 2, character 7, of input data items. For example, the data item 1814 may represent a structured or semi-structured data item including a "TYPE" field, where a value for the "TYPE" field typically is present at line 2, character 7 for similar types of data items. In this instance, instead of using a pattern matching table to process the data item 1814 character-by-character from beginning to end to determine the presence of the pattern "PEAR", a pattern function 1816 may be used to perform the same operation more efficiently. For example, a pattern function 1816 may be configured to perform a direct comparison of the data located at line 2, character 7, in the data item against the pattern "PEAR", and the function can ignore the remainder of the data item for the purposes of matching that particular pattern. Processing the fixed offset pattern in this manner may represent a significant efficiency improvement as compared to an implementation where the fixed offset pattern is included in a master pattern matching table which matches every pattern against the entire data item.

Returning to FIG. 17, at block 1704, a pattern matching table is generated for each variable offset pattern. For example, similar to the process described in reference to FIG. 9, for each of the patterns not identified as a fixed offset pattern in block 1702, a separate pattern matching table may be generated. In one embodiment, each of the variable offset patterns may be expressed using regular expressions, and the generated pattern matching tables may be regular expression matching tables.

At block 1706, a pattern function is generated for each one or more fixed offset patterns. In an embodiment, a pattern function generally represents any type of executable code, script, etc., which enables a DPI microservice or other processing component to determine whether one or more particular patterns exist in an input data item. For example, a pattern function may comprise an executable code segment written specifically for performing the pattern matching using one or more techniques instead of or in addition to regular expressing matching.

As one particular example, one pattern function may comprise a segment of code written in the C programming language which receives a data item, moves a pointer to a particular offset within the data item, and performs a direct evaluation of the portion of the data item at the particular offset to the pattern. If the code segment determines that the pattern and the portion of the data item are the same, it can return a positive match indicator; otherwise, the code segment may return a negative match indicator. In general, a pattern function may comprise any code segment, and may utilize any existing code (e.g., operating system functions), to perform the comparison. Each fixed offset pattern may be associated with a separate pattern function, or one or more pattern functions may be configured to search for the presence of two or more separate fixed offset patterns.

In one embodiment, a pattern function is generated programmatically through regular expression parsing of the pattern functions. For example, patterns containing offsets or anchors that restrict the match of a pattern to a subset of a data stream can be identified through matching the regular expression syntax used to specify offsets and anchors. Further filtering may be used to identify those patterns that can be matched using a numeric evaluation (characters at some offset will be a number that can be parsed using standard C string functions) or substring evaluation (alphanumeric characters of defined length with no variable characters).

At block 1708, the pattern matching tables of variable offset patterns are merged into a master pattern table. For example, similar to block 1104 in FIG. 11, a master pattern matching table may be generated by merging all of the states and state transitions comprising each of the individual pattern matching tables created at block 1704. In an embodiment, an alternative master pattern matching tables and one or more pattern class tables may be further generated.

Figure 19:
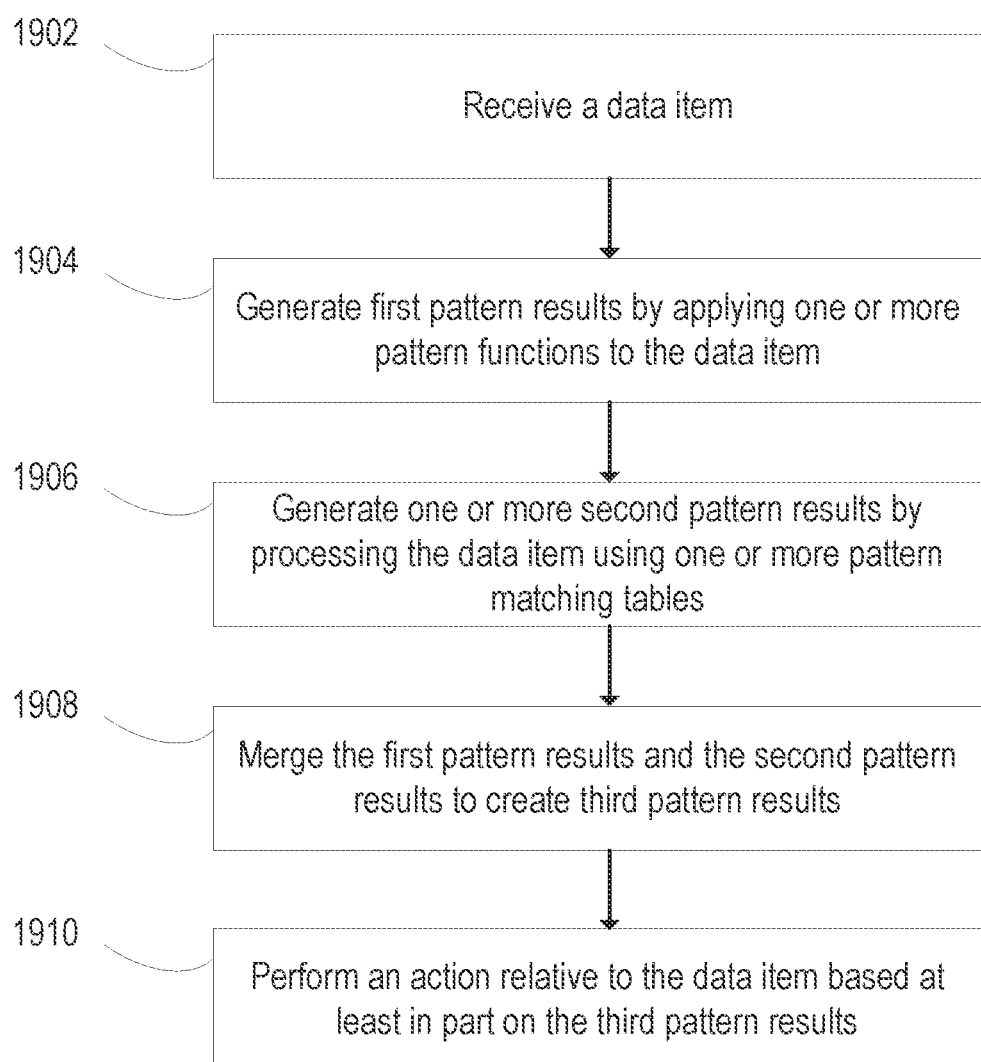
FIG. 19 is a flow diagram illustrating an example process of searching for patterns in a data item using both regular expression matching and pattern functions in accordance with the disclosed embodiments.

FIG. 19 depicts a flow diagram illustrating an example process for pattern matching data items using regular expression matching to search for a set of variable offset patterns and separately using pattern functions to search for a set of fixed offset patterns.

At block 1902, a data item is received. For example, a DPI microservice 1510 may receive one or more network messages, email messages, files, or other type of data item. In an embodiment, the DPI microservice 1510 may receive an entire data item, or receive the data item as an input stream and accessed from an input buffer.

At block 1904, first pattern results are generated by processing the data item using each of the created pattern functions. As described above, each of the pattern functions may be configured to determine whether the data item includes one or more patterns at one or more fixed offset locations. In an embodiment, each of the patterns functions may perform the matching using any number of different processes, including direct data comparisons, string matching using operating system functions, etc. The first pattern results may include zero or more patterns determined to exist in the data item based on executing the pattern functions against the data item.

At block 1906, second pattern results are generated based on processing the data item using a regular expression pattern matching process to search for the variable offset patterns. In an embodiment, a DPI microservice 1510 may use one or more of the master pattern matching table, alternative master pattern matching table, and/or pattern class matching tables generated in FIG. 17 to perform the regular expression pattern matching. The second pattern results similarly may include zero or more patterns from the pattern matching tables determined to exist in the data item. In an embodiment, the second pattern results may be generated at any time relative to generation of the first pattern results. For example, the second pattern results may be generated before, after, or concurrently with the generation of the first pattern results. Generating the first pattern results and the second pattern results in parallel, for example, may increase a speed with which the pattern results are generated.

At block 1908, the first pattern results and the second pattern results are merged to create a third pattern results. For example, all of the zero or more patterns matched based on the pattern functions, and all of the zero or more the patterns matched based on the regular expression matching, may be merged into a third pattern result set.

At block 1910, one or more actions are performed relative to the received data item based on the third pattern results. For example, based on detecting the presence of one or more particular patterns from the third pattern result set, the data item may be dropped, rejected, deleted, quarantined, or processed in any other manner.

4.0. Example Embodiments

Examples of some embodiments are represented, without limitation, in the following numbered clauses:

In an embodiment, a method or non-transitory computer readable medium comprises: searching a data item using a first pattern matching table; determining that one or more first patterns of the first pattern matching table exist in a first portion of the data item; in response to determining that the one or more first patterns of a first pattern matching table exist in a first portion of the data item, selecting a second pattern matching table from a plurality of pattern matching tables; searching a second portion of the data item for patterns using the second pattern matching table, wherein the second portion of the data item does not include the first portion of the data item; determining that one or more second patterns of the second pattern table exist in the second portion of the data item; performing an action relative to the data item based at least in part on the determination that the one or more first patterns exist in the first portion of the data item and the one or more second patterns exist in the second portion of the data item.

In an embodiment, a method or non-transitory computer readable medium comprises: wherein the first pattern matching is a regular expression table, and wherein determining that the one or more first patterns of the first pattern matching table exist in the first portion of the data item includes regular expression matching.

In an embodiment, a method or non-transitory computer readable medium comprises: wherein the second portion of the data is not compared against the one or more first patterns of the first pattern matching table.

In an embodiment, a method or non-transitory computer readable medium comprises: wherein the second pattern matching table is selected by a callback function associated with the first pattern matching table.

In an embodiment, a method or non-transitory computer readable medium comprises: wherein the first pattern matching table comprises a plurality of entries, each entry of the plurality of entries specifying a current state value, an input value, a next state value, a match indicator, and a callback function identifier; wherein the second pattern matching table is selected by a callback function identified by a callback function identifier in the first pattern matching table.

In an embodiment, a method or non-transitory computer readable medium comprises: wherein determining that the one or more first patterns of the first pattern matching table exist in the data item comprises: wherein the first pattern matching table comprises a plurality of entries, each entry of the plurality of entries specifying a current state value, an input value, a next state value, a match indicator, and a callback function identifier; receiving a next input value from the data item; based on a current state value and the next input value, identifying an entry in the first pattern table, the entry including a particular callback function identifier; wherein the second pattern matching table is selected by a callback function corresponding to the particular callback function identifier.

In an embodiment, a method or non-transitory computer readable medium comprises: wherein the second pattern matching table contains less than all of the patterns contained in the first pattern matching table.

In an embodiment, a method or non-transitory computer readable medium comprises: wherein each of the one or more first patterns is different from each of the one or more second patterns.

In an embodiment, a method or non-transitory computer readable medium comprises: wherein the data item comprises character-based data.

In an embodiment, a method or non-transitory computer readable medium comprises: wherein the data item comprises one or more of: an application protocol message, a network protocol message, an email message, a file.

In an embodiment, a method or non-transitory computer readable medium comprises: wherein the data item is received by a deep packet inspection (DPI) microservice.

In an embodiment, a method or non-transitory computer readable medium comprises: wherein the data item is received by a deep packet inspection (DPI) microservice, and wherein the DPI microservice comprises a software container.

In an embodiment, a method or non-transitory computer readable medium comprises: wherein at least one pattern of the one or more first patterns is expressed using a regular expression.

In an embodiment, a method or non-transitory computer readable medium comprises: wherein at least one pattern of the one or more first patterns is expressed using a regular expression; and wherein the first pattern matching table comprises one or more entries, each entry of the one or more entries representing a state of processing at least one regular expression.

In an embodiment, a method or non-transitory computer readable medium comprises: wherein the first pattern matching table is a master pattern table comprising entries corresponding states for all input patterns.

In an embodiment, a method or non-transitory computer readable medium comprises: generating, based on a plurality of input patterns, a master pattern table comprising states for the plurality of input patterns; generating, based on the plurality of input patterns, an alternative pattern table comprising states for a selected subset of the plurality of input patterns; wherein the first pattern matching table is the alternative pattern table.

In an embodiment, a method or non-transitory computer readable medium comprises: in response to determining that the one or more second patterns of the second pattern table exist in the second portion of the data item, selecting a third pattern matching table from the plurality of pattern tables; determining that one or more third patterns of the third pattern matching table exist in a third portion of the data item, wherein the third portion of the data item is not compared against either the one or more first patterns or the one or more second patterns.

In an embodiment, a method or non-transitory computer readable medium comprises: wherein the action comprises one or more: dropping the data item, rejecting the data item, deleting the data item, quarantining the data item.

In an embodiment, a method or non-transitory computer readable medium comprises: generating one or more first pattern results, the first pattern results indicating that one or more first patterns of a first set of patterns were determined to exist in a data item based on regular expression matching the one or more first patterns against the data item; generating one or more second pattern results, the one or more second pattern results indicating that one or more second patterns of a second set of patterns were determined to exist in the data item based on processing the data item by applying one or more pattern functions to the data item; merging the first pattern results and the second pattern results to create third pattern results; performing an action relative to the data item based at least in part on the third pattern results.

In an embodiment, a method or non-transitory computer readable medium comprises: partitioning a set of input patterns into the first set of patterns and the second set of patterns; wherein the first set of patterns includes patterns from the set of input patterns determined to not include a pattern element specifying a fixed offset.

In an embodiment, a method or non-transitory computer readable medium comprises: partitioning a set of input patterns into the first set of patterns and the second set of patterns; wherein the second set of patterns includes patterns from the set of input patterns determined to include a pattern element specifying fixed offset.

In an embodiment, a method or non-transitory computer readable medium comprises: wherein each pattern function of the one or more pattern functions involves determining whether one or more particular patterns exist in data items without performing regular expression matching.

In an embodiment, a method or non-transitory computer readable medium comprises: wherein at least one pattern function of the one or more pattern functions involves determining whether one or more particular patterns exist in data items based on a string comparison function.

In an embodiment, a method or non-transitory computer readable medium comprises: wherein the generating the one or more first pattern results further comprises: wherein one or more particular first patterns of the first patterns are specified in a first pattern table; in response to determining that the one or more particular first patterns exist in a first portion of the data item, selecting a second pattern table from a plurality of pattern tables; determining whether one or more second patterns of the second pattern table exist in a second portion of the data item, wherein the second portion of the data item is not compared against the one or more particular first patterns of the first pattern table; wherein the first pattern results include the first particular patterns and the second patterns.

In an embodiment, a method or non-transitory computer readable medium comprises: wherein the data item comprises character-based data.

In an embodiment, a method or non-transitory computer readable medium comprises: wherein the data item comprises one or more of: an application protocol message, a network protocol message, an email message, a file.

In an embodiment, a method or non-transitory computer readable medium comprises: wherein the data item is received by a deep packet inspection (DPI) microservice.

In an embodiment, a method or non-transitory computer readable medium comprises: wherein the data item is received by a deep packet inspection (DPI) microservice, and wherein the DPI microservice comprises a software container.

In an embodiment, a method or non-transitory computer readable medium comprises: wherein the action comprises one or more: dropping the data item, rejecting the data item, deleting the data item, quarantining the data item.

In an embodiment, a method or non-transitory computer readable medium comprises: wherein the one or more first pattern results are generated concurrently with generating the one or more second pattern results.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 20:
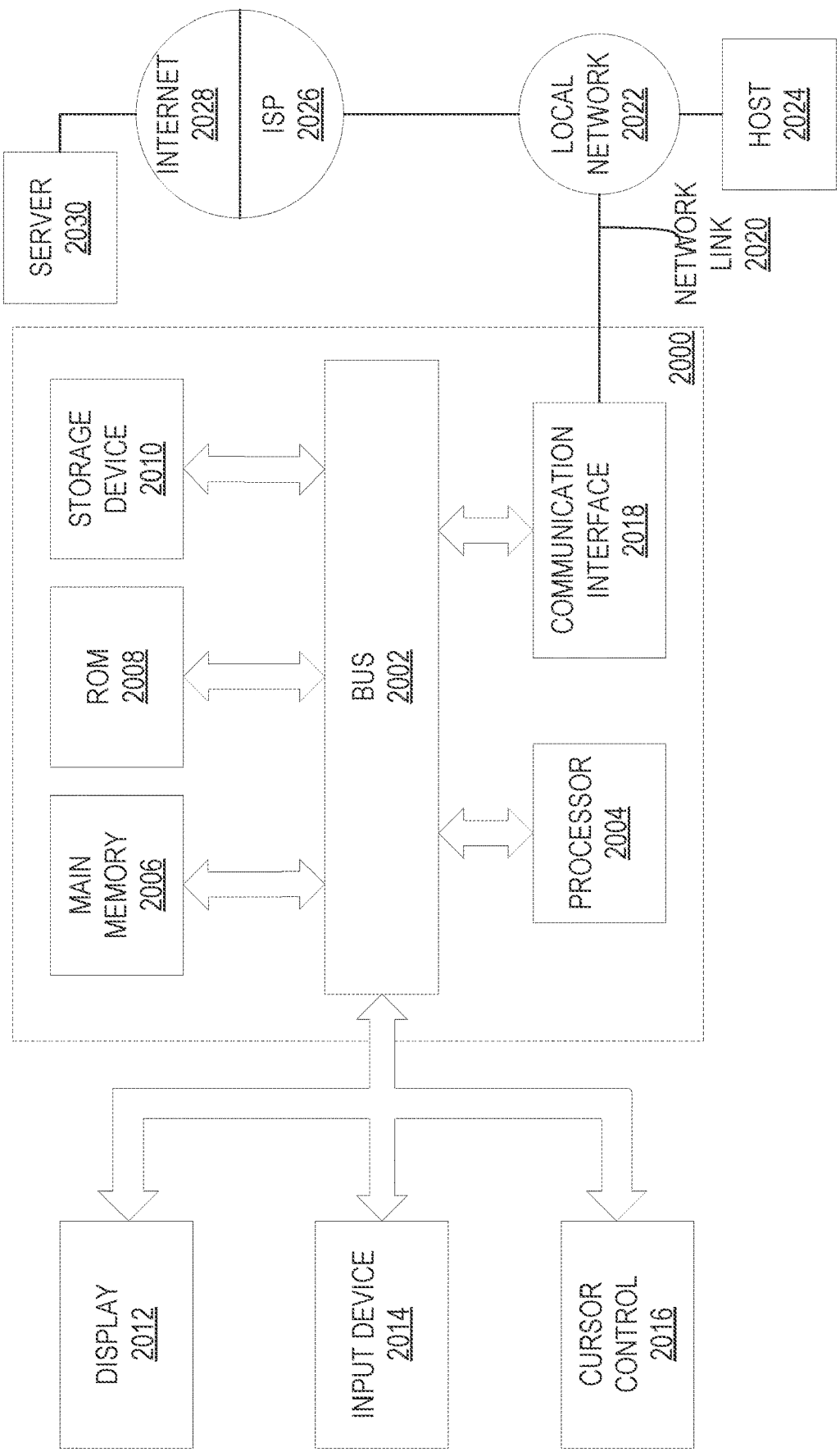
FIG. 20 illustrates a computer system upon which an embodiment may be implemented.

FIG. 20 is a block diagram that illustrates a computer system 2000 utilized in implementing the above-described techniques, according to an embodiment. Computer system 2000 may be, for example, a desktop computing device, laptop computing device, tablet, smartphone, server appliance, computing mainframe, multimedia device, handheld device, networking apparatus, or any other suitable device.

Computer system 2000 includes one or more buses 2002 or other communication mechanism for communicating information, and one or more hardware processors 2004 coupled with buses 2002 for processing information. Hardware processors 2004 may be, for example, general purpose microprocessors. Buses 2002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 2000 also includes a main memory 2006, such as a random access memory (RAM) or other dynamic or volatile storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 a special-purpose machine that is customized to perform the operations specified in the instructions.

Computer system 2000 further includes one or more read only memories (ROM) 2008 or other static storage devices coupled to bus 2002 for storing static information and instructions for processor 2004. One or more storage devices 2010, such as a solid-state drive (SSD), magnetic disk, optical disk, or other suitable non-volatile storage device, is provided and coupled to bus 2002 for storing information and instructions.

Computer system 2000 may be coupled via bus 2002 to one or more displays 2012 for presenting information to a computer user. For instance, computer system 2000 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 2012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 2012.

One or more input devices 2014 are coupled to bus 2002 for communicating information and command selections to processor 2004. One example of an input device 2014 is a keyboard, including alphanumeric and other keys. Another type of user input device 2014 is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane. Yet other examples of suitable input devices 2014 include a touch-screen panel affixed to a display 2012, cameras, microphones, accelerometers, motion detectors, and/or other sensors. In an embodiment, a network-based input device 2014 may be utilized. In such an embodiment, user input and/or other information or commands may be relayed via routers and/or switches on a Local Area Network (LAN) or other suitable shared network, or via a peer-to-peer network, from the input device 2014 to a network link 2020 on the computer system 2000.

A computer system 2000 may implement techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 2010. Volatile media includes dynamic memory, such as main memory 2006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 2000 can receive the data on the network and demodulate the signal to decode the transmitted instructions. Appropriate circuitry can then place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

A computer system 2000 may also include, in an embodiment, one or more communication interfaces 2018 coupled to bus 2002. A communication interface 2018 provides a data communication coupling, typically two-way, to a network link 2020 that is connected to a local network 2022. For example, a communication interface 2018 may be an integrated services digital network (ISDN) card, cable modem, satellite modem, or a modem to provide a data communication connection to a corresponding type of telephone line. As another example, the one or more communication interfaces 2018 may include a local area network (LAN) card to provide a data communication connection to a compatible LAN. As yet another example, the one or more communication interfaces 2018 may include a wireless network interface controller, such as a 802.11-based controller, Bluetooth controller, Long Term Evolution (LTE) modem, and/or other types of wireless interfaces. In any such implementation, communication interface 2018 sends and receives electrical, electromagnetic, or optical signals that carry digital data streams representing various types of information.

Network link 2020 typically provides data communication through one or more networks to other data devices. For example, network link 2020 may provide a connection through local network 2022 to a host computer 2024 or to data equipment operated by a Service Provider 2026. Service Provider 2026, which may for example be an Internet Service Provider (ISP), in turn provides data communication services through a wide area network, such as the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

In an embodiment, computer system 2000 can send messages and receive data, including program code and/or other types of instructions, through the network(s), network link 2020, and communication interface 2018. In the Internet example, a server X30 might transmit a requested code for an application program through Internet 2028, ISP 2026, local network 2022 and communication interface 2018. The received code may be executed by processor 2004 as it is received, and/or stored in storage device 2010, or other non-volatile storage for later execution. As another example, information received via a network link 2020 may be interpreted and/or processed by a software component of the computer system 2000, such as a web browser, application, or server, which in turn issues instructions based thereon to a processor 2004, possibly via an operating system and/or other intermediate layers of software components.

In an embodiment, some or all of the systems described herein may be or comprise server computer systems, including one or more computer systems 2000 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    searching a data item using a first pattern matching table;
    determining that a first pattern of the first pattern matching table exists in a first portion of the data item;
    based on determining that the first pattern of a first pattern matching table exists in the first portion of the data item, selecting a second pattern matching table from a plurality of pattern matching tables;
    searching a second portion of the data item for patterns using the second pattern matching table;
    determining that a second pattern of the second pattern matching table exists in the second portion of the data item; and
    performing an action relative to the data item based at least in part on the determination that the first pattern exists in the first portion of the data item and the second pattern exists in the second portion of the data item.

2. The method of claim 1, wherein the first pattern matching table is a regular expression table, and wherein determining that the first pattern of the first pattern matching table exists in the first portion of the data item includes regular expression matching.

3. The method of claim 1, wherein the second portion of the data item is not compared against the first pattern of the first pattern matching table.

4. The method of claim 1, wherein the second pattern matching table is selected by a callback function associated with the first pattern matching table.

5. The method of claim 1, wherein the first pattern matching table comprises a plurality of entries, each entry of the plurality of entries specifying a current state value, an input value, a next state value, a match indicator, and a callback function identifier; and
    wherein the second pattern matching table is selected by a callback function identified by a callback function identifier in the first pattern matching table.

6. The method of claim 1, wherein determining that the first pattern of the first pattern matching table exists in the data item comprises:
    wherein the first pattern matching table comprises a plurality of entries, each entry of the plurality of entries specifying a current state value, an input value, a next state value, a match indicator, and a callback function identifier;
    receiving a next input value from the data item;
    based on a current state value and the next input value, identifying an entry in the first pattern matching table, the entry including a particular callback function identifier; and
    wherein the second pattern matching table is selected by a callback function corresponding to the particular callback function identifier.

7. The method of claim 1, wherein the second pattern matching table contains less than all of the patterns contained in the first pattern matching table.

8. The method of claim 1, wherein the first pattern is different from the second pattern.

9. The method of claim 1, wherein the data item comprises character-based data.

10. The method of claim 1, wherein the data item comprises one or more of: an application protocol message, a network protocol message, an email message, a file.

11. The method of claim 1, wherein the data item is received by a deep packet inspection (DPI) microservice.

12. The method of claim 1, wherein the data item is received by a deep packet inspection (DPI) microservice, and wherein the DPI microservice comprises a software container.

13. The method of claim 1, wherein the first pattern is expressed using a regular expression.

14. The method of claim 1, wherein the first pattern is expressed using a regular expression; and
    wherein the first pattern matching table comprises one or more entries, each entry of the one or more entries representing a state of processing at least one regular expression.

15. The method of claim 1, wherein the first pattern matching table is a master pattern table comprising entries corresponding states for all input patterns.

16. The method of claim 1, further comprising:
    generating, based on a plurality of input patterns, a master pattern table comprising states for the plurality of input patterns;
    generating, based on the plurality of input patterns, an alternative pattern table comprising states for a selected subset of the plurality of input patterns;
    wherein the first pattern matching table is the alternative pattern table.

17. The method of claim 1, further comprising:
    in response to determining that the second pattern of the second pattern matching table exists in the second portion of the data item, selecting a third pattern matching table from the plurality of pattern matching tables;
    determining that a third pattern of the third pattern matching table exists in a third portion of the data item, wherein the third portion of the data item is not compared against either the first pattern or the second pattern.

18. The method of claim 1, wherein the action comprises one or more: dropping the data item, rejecting the data item, deleting the data item, quarantining the data item.

19. One or more non-transitory computer-readable storage media storing instructions which, when executed by one or more hardware processors, cause performance of:
    searching a data item using a first pattern matching table;
    determining that a first pattern of the first pattern matching table exists in a first portion of the data item;
    based on determining that the first pattern of a first pattern matching table exists in the first portion of the data item, selecting a second pattern matching table from a plurality of pattern matching tables;
    searching a second portion of the data item for patterns using the second pattern matching table;
    determining that a second pattern of the second pattern matching table exists in the second portion of the data item; and
    performing an action relative to the data item based at least in part on the determination that the first pattern exists in the first portion of the data item and the second pattern exists in the second portion of the data item.

20. An apparatus, comprising:
one or more hardware processors;
memory coupled to the one or more hardware processors, the memory storing instructions which, when executed by the one or more hardware processors, causes the apparatus to:
search a data item using a first pattern matching table;
determine that a first pattern of the first pattern matching table exists in a first portion of the data item;
based on determining that the first pattern of a first pattern matching table exists in the first portion of the data item, select a second pattern matching table from a plurality of pattern matching tables;
search a second portion of the data item for patterns using the second pattern matching table;
determine that a second pattern of the second pattern matching table exists in the second portion of the data item; and
perform an action relative to the data item based at least in part on the determination that the first pattern exists in the first portion of the data item and the second pattern exists in the second portion of the data item.

* * * * *